US012793002B2

(12) United States Patent
Lin et al.

(10) Patent No.: US 12,793,002 B2
(45) Date of Patent: Nov. 10, 2026

(54) SYSTEMS AND METHODS FOR USING MACHINE VISION IN DISTRIBUTION FACILITY OPERATIONS AND TRACKING DISTRIBUTION ITEMS

(71) Applicant: United States Postal Service, Washington, DC (US)

(72) Inventors: David C. Lin, Falls Church, VA (US); Shahpour Ashaari, Bethesda, MD (US); Assebe Eshete, Alexandria, VA (US); Mario Andre Salisbury, Miami, FL (US); Phung Nguyen, Portland, OR (US); Erich Joseph Petre, Gainesville, VA (US)

(73) Assignee: United States Postal Service, Washington, DC (US)

( * ) Notice: Subject to any disclaimer, the term of this patent is extended or adjusted under 35 U.S.C. 154(b) by 589 days.

(21) Appl. No.: 18/315,363

(22) Filed: May 10, 2023

(65) Prior Publication Data

US 2023/0368119 A1 Nov. 16, 2023

Related U.S. Application Data

(60) Provisional application No. 63/364,710, filed on May 13, 2022.

(51) Int. Cl.

| | |
|---|---|
| ***G06Q 10/08*** | (2024.01) |
| ***G05D 1/00*** | (2024.01) |
| ***G06K 7/14*** | (2006.01) |
| ***G06V 20/52*** | (2022.01) |

(52) U.S. Cl.
CPC ............. *G06Q 10/08* (2013.01); *G05D 1/021* (2013.01); *G06K 7/1404* (2013.01); *G06V 20/52* (2022.01)

(58) Field of Classification Search
CPC ...... G06Q 10/08; G05D 1/021; G05D 1/0033; G06K 7/1404; G06V 20/52; G06V 2201/06
See application file for complete search history.

(56) References Cited

U.S. PATENT DOCUMENTS

| | | | | |
|---|---|---|---|---|
| 4,786,229 | A * | 11/1988 | Henderson | B65G 1/1371 700/215 |
| 9,002,506 | B1 | 4/2015 | Agarwal | |
| 9,336,509 | B1 | 5/2016 | Arun Singhal | |
| 9,387,982 | B1 * | 7/2016 | Corey, Jr. | B65G 11/203 |
| 9,561,941 | B1 * | 2/2017 | Watts | G05D 1/0268 |
| 9,792,577 | B2 | 10/2017 | Mountz | |
| 9,827,683 | B1 * | 11/2017 | Hance | G06Q 10/087 |
| 9,963,331 | B1 * | 5/2018 | Holmberg | G05D 1/0212 |
| 10,733,565 | B1 * | 8/2020 | Stephens | G06V 40/10 |
| 11,250,376 | B2 * | 2/2022 | Fisher | G06Q 10/087 |

(Continued)

FOREIGN PATENT DOCUMENTS

| | | | | |
|---|---|---|---|---|
| CA | 3136541 C * | 8/2023 | B65G 61/00 |
| WO | WO-2023178287 A1 * | 9/2023 | G06Q 10/087 |

*Primary Examiner* — Michael Jared Walker
(74) *Attorney, Agent, or Firm* — Knobbe, Martens, Olson & Bear, LLP

(57) ABSTRACT

This disclosure relates to systems and methods of using machine vision in a distribution network environment. In particular, this disclosure relates to systems and methods for automatically monitoring zones within a distribution facility with machine vision and generating notifications.

13 Claims, 17 Drawing Sheets

(56) References Cited

U.S. PATENT DOCUMENTS

| | | | | |
|---|---|---|---|---|
| 11,353,858 | B2 | 6/2022 | Shiu et al. | |
| 11,797,022 | B1 * | 10/2023 | Ballantyne | G06T 7/13 |
| 2013/0054129 | A1 * | 2/2013 | Wong | B66F 9/063 702/150 |
| 2014/0074341 | A1 * | 3/2014 | Weiss | G05D 1/0246 701/25 |
| 2015/0032252 | A1 * | 1/2015 | Galluzzo | B25J 9/162 700/218 |
| 2016/0176638 | A1 * | 6/2016 | Toebes | G05D 1/0282 701/25 |
| 2017/0278051 | A1 * | 9/2017 | Cohn | G06Q 10/087 |
| 2017/0283171 | A1 * | 10/2017 | High | B65G 1/0492 |
| 2017/0297820 | A1 * | 10/2017 | Grinnell | G05D 1/0297 |
| 2018/0032949 | A1 | 2/2018 | Galluzzo et al. | |
| 2018/0053141 | A1 | 2/2018 | Shydo, Jr. | |
| 2018/0096299 | A1 | 4/2018 | Jarvis et al. | |
| 2018/0120465 | A1 | 5/2018 | Rose et al. | |
| 2018/0127212 | A1 * | 5/2018 | Jarvis | B65G 1/1375 |
| 2018/0137458 | A1 | 5/2018 | Repensek | |
| 2018/0150798 | A1 | 5/2018 | Wilkinson et al. | |
| 2018/0215544 | A1 * | 8/2018 | High | G06K 7/1417 |
| 2018/0218185 | A1 | 8/2018 | High | |
| 2018/0307941 | A1 | 10/2018 | Holz et al. | |
| 2019/0050790 | A1 * | 2/2019 | Ferguson | G05D 1/6445 |
| 2019/0064845 | A1 * | 2/2019 | Pardasani | G05D 1/0282 |
| 2019/0193629 | A1 | 6/2019 | Zevenbergen et al. | |
| 2019/0210849 | A1 * | 7/2019 | High | B66F 9/063 |
| 2019/0310645 | A1 * | 10/2019 | Wu | G05B 19/41895 |
| 2020/0000061 | A1 * | 1/2020 | Yamamoto | B32B 5/26 |
| 2020/0005226 | A1 | 1/2020 | Sikka | |
| 2020/0034780 | A1 * | 1/2020 | Sikka | G06Q 30/0202 |
| 2020/0061927 | A1 | 2/2020 | Millhouse et al. | |
| 2020/0074432 | A1 * | 3/2020 | Valdman | G07G 5/00 |
| 2020/0242544 | A1 * | 7/2020 | Galluzzo | B25J 9/1692 |
| 2021/0358069 | A1 * | 11/2021 | Lewandowski | B66F 17/003 |
| 2021/0374406 | A1 * | 12/2021 | Brun | G06F 16/24569 |
| 2021/0395008 | A1 | 12/2021 | Zheng | |
| 2022/0129841 | A1 * | 4/2022 | Gutke | G08B 13/19602 |
| 2022/0141082 | A1 * | 5/2022 | Brun | G06T 7/001 709/223 |
| 2022/0187847 | A1 * | 6/2022 | Cella | G05B 19/41885 |
| 2023/0030779 | A1 * | 2/2023 | DeLuca | G06V 10/945 |

* cited by examiner

SYSTEMS AND METHODS FOR USING MACHINE VISION IN DISTRIBUTION FACILITY OPERATIONS AND TRACKING DISTRIBUTION ITEMS

INCORPORATION BY REFERENCE

Any and all applications for which a foreign or domestic priority claim is identified in the Application Data Sheet as filed with the present application are hereby incorporated by reference under 37 C.F.R. § 1.57. This application claims the benefit of priority to U.S. provisional application 63/364,710, filed May 13, 2022, the entire contents of which are hereby incorporated by reference.

BACKGROUND

This disclosure relates to systems and methods of using machine vision in a distribution network environment. In particular, this disclosure relates to systems and methods for automatically monitoring zones within a distribution facility with machine vision and generating notifications.

SUMMARY

Methods and apparatuses or devices disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the described features provide advantages.

In some embodiments, a machine vision system for a distribution facility is disclosed herein. The system can include one or more sensors that can capture a field of view of a zone in the distribution facility. The system can include a control system. The control system can have a controller, a processor, and/or a memory system. The memory system can include instructions, wherein the processor is connected to the memory system and executes the instructions that can cause the control system to receive sensor input of the captured field of view, interpret the sensor input to identify one or more items in the zone, and/or generate, via the controller, a notification based on the interpreted sensor input.

In some embodiments, the instructions, when executed by the processor, can cause the control system to monitor a dwell time of the one or more items in the zone, determine if the dwell time has exceeded a threshold dwell time, and/or in response to determining that the dwell time has exceeded the threshold dwell time, indicate with the notification that the dwell time has exceeded the threshold dwell time.

In some embodiments, the instructions, when executed by the processor, can cause the control system to, in response to determining that the dwell time has exceeded the threshold dwell time, summon an automated guided vehicle to retrieve the one or more items.

In some embodiments, the instructions, when executed by the processor, can cause the control system to command the automated guided vehicle to transport the one or more items to another location in the distribution facility.

In some embodiments, the instructions, when executed by the processor, can cause the control system to monitor an occupancy of the zone, determine if the occupancy of the zone has exceeded an upper threshold, and in response to determining that the occupancy of the zone has exceeded the upper threshold, indicate with the notification that the occupancy of the zone has exceeded the upper threshold.

In some embodiments, the instructions, when executed by the processor, can cause the control system to monitor an occupancy of the zone, determine if the occupancy of the zone has exceeded an upper threshold for a threshold amount of time, and in response to determining that the occupancy of the zone has exceeded the upper threshold for the threshold amount of time, indicate with the notification that the occupancy of the zone has exceeded the upper threshold for the threshold amount of time.

In some embodiments, the instructions, when executed by the processor, can cause the control system to summon an automated guided vehicle to retrieve the one or more items from the zone.

In some embodiments, the instructions, when executed by the processor, can cause the control system to command the automated guided vehicle to transport the one or more items from the zone to another zone having an occupancy to receive the one or more items.

In some embodiments, the instructions, when executed by the processor, can cause the control system to indicate with the notification a destination zone for the one or more items, the destination zone having an occupancy, determined by the control system, to receive the one or more items.

In some embodiments, the control system can identify the one or more items in the zone by reading a computer readable code on the one or more items.

In some embodiments, the control system can identify the one or more items in the zone by recognizing unique characteristics of the one or more items.

In some embodiments, the unique characteristics can include wear patterns on the one or more items.

In some embodiments, the instructions, when executed by the processor, can cause the control system to determine a route for the identified one or more items, determine if the one or more items being in the zone is consistent with the route, and in response to determining that the one or more items being in the zone is not consistent with the route, indicate with the notification that the one or more items being in the zone is not consistent with the route.

In some embodiments, the instructions, when executed by the processor, can cause the control system to summon an automated guided vehicle to retrieve the one or more items from the zone.

In some embodiments, the instructions, when executed by the processor, can cause the control system to command the automated guided vehicle to transport the one or more items from the zone to another location having an occupancy, determined by the control system, to receive the one or more items.

In some embodiments, the instructions, when executed by the processor, can cause the control system to determine a fill level of the one or more items.

In some embodiments, a method of generating a graphical user interface for a machine vision system for a distribution facility is disclosed herein. The method can include receiving sensor input of a captured field of view of a zone in a distribution facility. The method can include interpreting the sensor input to identify an item in the zone. The method can include generating a graphical user interface based on the interpreted sensor input, the graphical user interface can include a representation of a floor plan of the distribution facility and a video feed of the captured field of view of the zone. The method can include overlaying a graphic on the item in the video feed, the overlaid graphic moving with the item as the item moves in the video feed. The method can include determining a location of the item in the distribution facility based on the sensor input. The method can include overlaying an indicator graphic associated with the item on the floor plan in a position corresponding to the determined location of the item.

The method can include displaying graphical representations of boundaries the zone on each of the video feed and the floor plan.

The method can include generating a heat map on the floor plan indicative of space usage in the zone over a period of time.

The method can include monitoring a dwell time of the identified item, determining if the dwell time of the identified item in the zone has exceeded a threshold dwell time, and in response to determining that the dwell time of the identified item in the zone has exceeded the threshold dwell time, generating a notification that the dwell time has exceeded the threshold dwell time.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
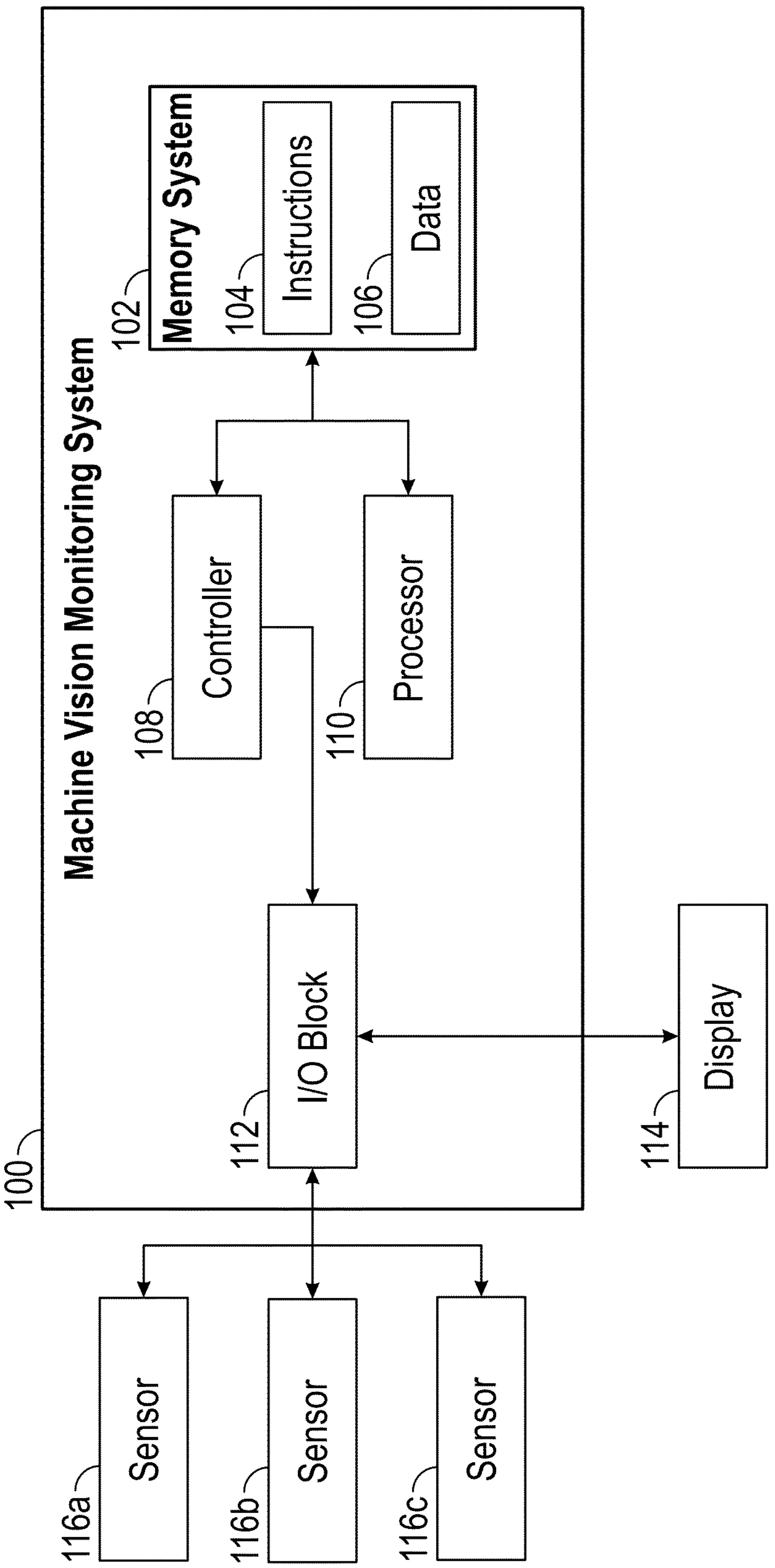
FIG. 1 illustrates a block diagram of an exemplary machine vision monitoring system.

Methods and apparatuses or devices disclosed herein each have several aspects, no single one of which is solely responsible for its desirable attributes. Without limiting the scope of this disclosure, for example, as expressed by the claims which follow, its more prominent features will now be discussed.

In the following detailed description, reference is made to the accompanying drawings, which form a part thereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

The quantity of items being handled by logistics systems, for example, by distribution networks, is rising. As used herein, the term item may refer to an individual article, object, agglomeration of articles, or container having more than one article within, in a distribution system. The item may be a letter, magazine, flat, luggage, package, box, or any other item of inventory which is transported or delivered in a distribution system or network. The term item may also refer to a unit or object which is configured to hold one or more individual items, such as a container which holds multiple letters, magazines, boxes, etc. The term item may also include any object, container, storage area, rack, tray, truck, trailer, train car, airplane, or other similar device into which items or articles may be inserted and subsequently transported, as are commonly used in distribution systems and networks.

Operators in distribution facilities can manually monitor items within a distribution facility. However, with high volumes of items, operator shift changes, the incorporation of automated guided vehicles (AGVs) into processing procedures, dynamic schedules, various item requirements, and/or other variables in a distribution network, manually monitoring items can result in inefficiencies and errors, which can result in wasted time, work hours, facilitate space, and in errors.

The present disclosure relates to systems and methods for using machine vision in a distribution network environment to track items, monitor operations, and improve operational efficiency. Machine vision can use sensors, such as cameras, positioned in various locations of distribution network facilities to identify and items, delivery resources, equipment, and to provide instructions and cause operational actions to be taken.

As used herein, delivery resource or asset may refer to employees, operators, carriers, drivers, automated guided vehicles, pallet jacks, forklifts, and the like. Equipment described herein can be mail processing equipment, sorters, conveyors, hoppers, etc.

A distribution network may comprise multiple levels. For example, a distribution network may comprise regional distribution facilities, hubs, and unit delivery facilities, or any other desired level. For example, a nationwide distribution network may comprise one or more regional distribution facilities having a defined coverage area (such as a geographic area), designated to receive items from intake facilities within the defined coverage area, or from other regional distribution facilities. The regional distribution facility can sort items for delivery to another regional distribution facility, or to a hub level facility within the regional distributional facility's coverage area. A regional distribution facility can have one or more hub level facilities within its defined coverage area. A hub level facility can be affiliated with a few or many unit delivery facilities and can sort and deliver items to the unit delivery facilities with which it is associated. In the case of the United States Postal Service (USPS), the unit delivery facility may be associated with a ZIP Code. The unit delivery facility receives items from local senders, and from hub level facilities or regional distribution facilities. The unit delivery facility also sorts and stages the items intended for delivery to destinations within the unit delivery facility's coverage area.

The terms mail, mailpiece, and others terms are used to describe embodiments of the present development. These terms are exemplary only, and the scope of the present disclosure is not limited to mail, mailpiece, or postal applications. In embodiments described here, the USPS is used as an example of a distribution network to describe and illustrate various features of the current disclosure, but the disclosure is not limited thereto.

A distribution network can use systems and methods described herein to increase operational efficiency and improve item flow, such as mail flow, via sensing systems utilizing machine or computer vision to autonomously identify, distinguish, locate, and trace assets, to determine dock zone density, fill levels, load/no load, load/unload, and dwell time. In some embodiments, the assets can be mailing products, containers, wire containers, rolling stock, pallets, shelves, wiretainers, or the like. In some embodiments, the assets can be mail processing support resources, such as vehicles, forklifts, automated guided vehicles, sorting devices, trailers, etc. Systems and methods described herein can identify and track the assets as they move within a facility, between facilities, and in various facilities of the distribution network to allow for locating applicable assets in either real-time or near real-time. The systems can also identify inefficiencies and unexpected movements, alert to problems, establish facility operation plans, and correct operational problems. The systems and methods described herein can summon assets to a particular location, such as to a dock or to item processing equipment when an inefficiency, backlog, delay, failure, or other problem has been detected or is predicted to occur. The systems and methods described herein can move items, start and/or start machines, reroute assets through a facility or through processing equipment, generate and send alerts, and the like. These actions can be taken automatically, for example, when a condition described herein is detected or predicted to occur.

Systems and methods described herein can utilize machine vision technology to identify, detect, and locate assets in real time or near real time (e.g., <10 seconds). In some embodiments, there may be over a million individual assets within close proximity of each other, the system can differentiate between said assets by creating and maintaining asset identifiers for each unique asset. The system also can identify asset characteristics such as container fill level, item volume or quantity.

In some embodiments, a system for machine vision can be implemented in a distribution network facility without making significant alterations, such as changing lighting, floorplans, floor appearance, container features, and the like. In some embodiments, the system can identify items and locations with a 5 inch accuracy at 90% precision. In some embodiments, the system can identify items and locations with a 2 inch accuracy at a 90% precision.

The system can generate an overlay of the detected locations of items on an image or camera feed of the facility in real time or near real time. The system can generate a GUI enabling a user to interact with the overlay and the image of the facility. The system can identify unique and individual container's locations and fill levels throughout the facility and can identify a unique identifier on the items and continuously track the items, resources, and equipment throughout the facility, as the item resource moves from the field of view of one camera and into another. The item or asset can also be uniquely identified as the item or asset moves from one facility to another such that a system in a different facility can recognize the same item based on unique characteristics of the item or asset. The system can read an item or asset tag, such as a computer readable code located on a label or placard on the item in order to determine the contents of an item or asset, to uniquely track the item or asset, and to determine or retrieve a routing or sort plan for the item or asset.

The system can further identify and determine when an item or asset nears, enters, and/or exits a particular area of a facility or a controlled environment, provide notifications of the same, and update processing plans based on the item movement. The system can identify whether an asset, such as a vehicle, has a load or is empty. For example, the system can identify if a forklift or pallet jack has a load, whether a tug is pulling carts or containers, how many carts or containers the tug is pulling, and the fill volume of the carts and containers. In some embodiments, the system can determine whether or how loaded a vehicle is by analyzing the speed of the vehicle compared with known speeds for loaded, partially loaded, and unloaded vehicles.

As items and assets move through a facility, the system can identify and determine the amount of time a particular item or asset spends in any given zone or area of a facility. If the dwell time of an item or asset is too long in a particular area, the system can initiate a notification, alert, or a corrective action to move an item or asset that has met or exceeded a set threshold. The system can identify how busy a zone or area of the facility is in order to identify inefficiencies in item/asset movement or if a floorplan rearrangement is needed.

The system can provide a GUI or display which overlays or depicts item and asset positions on a map of a facility and can update the map as the locations of assets and items change. Using positions of assets and items on a map, the system can evaluate the utilization of space in various areas of a facility and in the facility as a whole. The system can provide metrics of space utilization and can direct and implement utilization improvements.

Systems and methods described herein can train and utilize machine learning and AI models to analyze whether specific delivery resources or assets are carrying loads as they travel and determine whether the loads are productive. For example, if a particular vehicle travels frequently without loads, the system can identify an unproductive or inefficient vehicle and can reroute or reassign in order to increase efficiency.

FIG. 1 schematically illustrates an embodiment of a machine vision system 100. The machine vision system 100 can be used to monitor a distribution network environment. The architecture of the machine vision system 100 can include an arrangement of computer hardware and software components to implement aspects of the present disclosure. The machine vision system 100 may include more or fewer elements than those shown in FIG. 1. It is not necessary, however, that all of these elements be shown in order to provide an enabling disclosure. As illustrated, the machine vision system 100 can include and/or be in communication with an I/O block 112, controller 108, processor 110, graphical user interface 114, sensor(s) (e.g., sensor 116*a*, sensor 116*b*, and/or sensor 116*c*), and memory system 102, all of which can communicate with one another by way of a data communication technique.

The processor 110 can read and/or write to the memory system 102 and store data in a data structure 106 regarding the distribution network environment, which data can at least include information regarding items and/or assets in various zones of the distribution network environment. The processor 110 can execute instructions 104 on memory system 102 to perform methods described herein. The instructions 104 may include procedures, program code, or other logic that initiates, modifies, directs, and/or eliminates operations necessary or advantageous for the methods described herein. In some embodiments, one or more portions of the memory system 102 can be remotely located, such as on a server or other component of a distribution facility network and can be wired or wirelessly communicate with the controller 108 and processor 110.

The I/O block 112 can receive, communicate, and/or send commands, information, and/or communication between the machine vision system 100 and other peripheral devices and/or systems. The I/O block 112 can connect to one or more sensors, which can at least include sensor 116*a*, sensor 116*b*, and/or sensor 116*c*. The sensors can be located at one facility. In some embodiments, the sensors 116*a-c* can be located in multiple facilities, or multiple facilities may each have sensors 116*a-c* located therein.

The controller 108 can, which can include cooperation with the I/O block 112, interface with peripheral devices such as the one or more sensors. The controller 108 can provide a link between different elements of the machine vision system 100, such as between the I/O block 112 and the memory system 102. The controller 108 can generate commands to effectuate the instructions 104.

The memory system 102 can include RAM, ROM, and/or other persistent auxiliary or non-transitory computer-readable media. The memory system 102 can store an operating system that provides computer program instructions for use by the processor 110 in the general administration and operation of the machine vision system 100. The instructions 104, when executed by the processor 110, can cause the machine vision system 100 to receive sensor input from the one or more sensors (e.g., sensor 116*a*, sensor 116*b*, and/or sensor 116*c*) indicative of the location, identity, status, and/or capacity of an item and/or asset in the distribution network environment. The instructions 104, when executed by the processor 110, can cause the machine vision system 100 to interpret sensor input to determine an operation that is desirable, appropriate, and/or correct in response to and/or associated with the received user input. The instructions 104, when executed by the processor 110, can cause the machine vision system 100 to perform the methods described herein, which can include the processor 110 generating via the controller 108 to effectuate the methods.

The machine vision system 100 can include and/or be in communication with one or more sensors, which can at least include sensor 116*a*, sensor 116*b*, and/or sensor 116*c*. The one or more sensors can be existing sensors within a distribution network environment that are incorporated into and/or put in communication with a machine vision system 100. The one or more sensors can detect, locate, and/or identify items, assets, structures, and/or other things in the vicinity of the one or more sensors. The one or more sensors can include one or more of the following: an optic sensor, photo sensor, light sensor, video camera sensor, camera sensor, radar sensor, infrared sensor (including infrared laser mapping), thermal sensor, laser sensor, LiDAR sensor, proximity sensor, capacitive sensor, ultrasonic sensor, 3D sensor, and/or any combination of sensing systems used to determine distance, presence, movement, read computer readable codes, identification, etc. The one or more sensors can relay sensor input data to the machine vision system 100, which can be by way of the I/O block 112. The one or more sensors can be positioned at various positions in the distribution network facility. The one or more sensors can be positioned in fixed locations and/or, in some embodiments, disposed on things (e.g., items and/or assets) moving about the distribution network environment. The sensors at various facilities of the distribution network can be in communication with each other directly or through processor 110 and/or controller 108. With the machine vision monitoring system 100 being connected to or in place at various facilities in communication with each other, an item can be identified and tracked at various facilities. Items in the distribution network can be identified as being the same unique item at a first facility and subsequently at a second facility. The unique identity of items can persist across different facilities and locations in the distribution network.

The machine vision system 100 can include and/or be in communication with a display 114. The display 114 can visually communicate information to an operator, which can at least include notifications and/or data regarding the distribution network environment such as zones, items, and/or assets. In some embodiments, the machine vision system 100 can include and/or be in communication with a speaker to audibly communicate data and/or notifications. The display 114 can display the graphical user interfaces disclosed herein. The display 114 may be a touchscreen.

Figure 2:
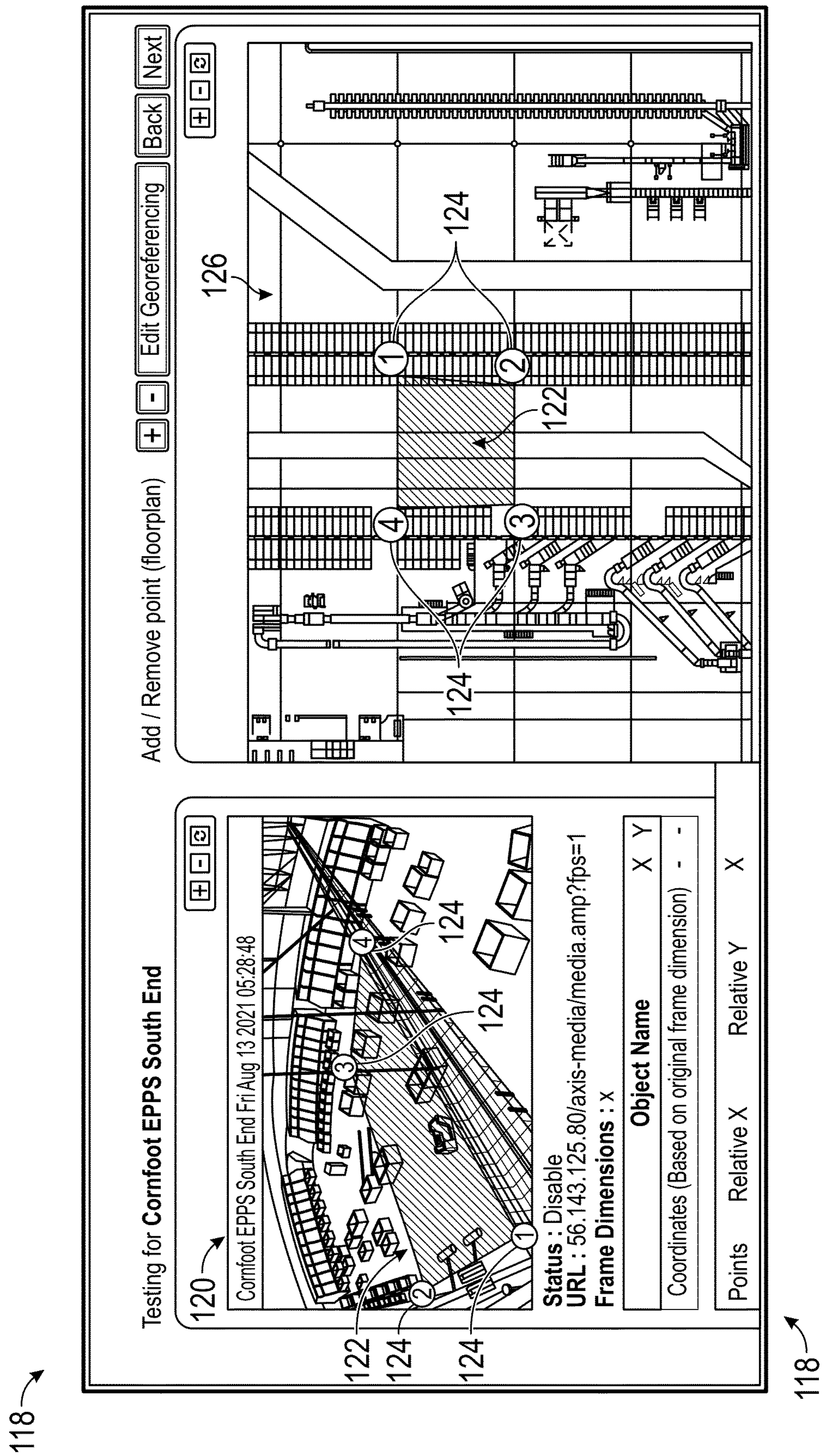
FIG. 2 illustrates an exemplary graphical user interface displaying a real-time video feed and floor plan.

FIG. 2 illustrates an example graphical user interface 118 that can be displayed on the display 114. The graphical user interface 118 can show a real-time video feed 120 of an area of a distribution network environment. The operator, in some embodiments, can elect between multiple sensor inputs to view the same area of the distribution network environment from different angles. In some embodiments, the machine vision system 100 can determine the sensor input best suited to display an area of the distribution network environment. The operator, in some embodiments, can elect between multiple sensor inputs to view different areas of the distribution network environment. The operator, in some embodiments, can elect to view a different area of the distribution network environment, prompting the machine vision system 100 to display a real-time video feed 120 on the graphical user interface 118 from a different sensor input that corresponds to the elected different area. The sensor providing the input for the real-time video feed 120 can be used to identify, monitor, track, etc. items and/or assets in the field of view of the sensor.

An area of the distribution network environment may be within the fields of view of multiple sensors, but one of the multiple sensors may have a superior field of view compared to the others. Accordingly, in order to avoid duplicative monitoring of an area of the distribution network environment, the portions of the fields of view of the other sensors that capture the area of duplicative monitoring may be ignored (e.g., masked) such that the sensor with the superior field of view monitors the area. Additionally, portions of the fields of view of the sensors may be irrelevant. For example, the field of view of a sensor may capture the ceiling or walls of the distribution network environment, which may be irrelevant to monitoring. Accordingly, the portion of the field of view capturing the ceiling or walls may be ignored to improve efficiency. The operator may indicate the portions of the fields of view of the one or more sensors to ignore. For example, the operator may draw in the real-time video feed 120 portions of the frame to ignore. The machine vision system 100 may automatically indicate portions of the frame of the one or more sensors to ignore.

The graphical user interface 118 can show a graphical representation of a zone 122 overlaid on the real-time video feed 120. The zone 122 can define a specific area of the distribution network environment for monitoring, which can include data analysis. For example, the machine vision system 100 can monitor items and/or assets in the zone 122. The machine vision system 100 can identify items and/or assets in the zone 122, determine whether items and/or assets in the zone 122 should be in the zone 122, the occupancy percentage of the zone 122, the quantity of items and/or assets in the zone 122, the dwell time of items and/or assets in the zone 122, associate the items and/or assets in the zone 122 with the zone 122 for tracking purposes, the density of items and/or assets in the zone 122, whether items and/or assets are outbound or inbound relative to the zone, etc. The machine vision system 100 can generate notifications (e.g., alert an operator to take action such as retrieve one or more items) and/or initiate actions (e.g., summon an automated guided vehicle to retrieve one or more items) based on the monitoring of the zone 122. The shape and size of the zone 122 can be indicated by an operator and overlaid on the real-time video feed 120. For example, the operator can create a polygonal shape by indicating the corners 124 of the shape on the image of the real-time video feed 120. In some embodiments, the operator can draw an irregular shape and size for the zone 122.

The graphical user interface 118 can show a floor plan 126, which can also be referred to as a map or diagram, of a distribution network environment. The floor plan 126 can show a representation (e.g., top plan view) of the distribution network environment. The floor plan 126 can be a schematic representation of things (e.g., structures, walls, processing equipment, shelving, etc.) having a fixed location in the distribution network environment. The real-time video feed 120 can show a portion of the distribution network environment that corresponds to a portion of the floor plan 126. The zone 122 can be overlaid on the floor plan 126 at a location that corresponds to the zone 122 overlaid on the real-time video feed 120. In some embodiments, the operator can indicate the boundary of the zone 122 over the floor plan 126, which can be in a similar manner to that described in reference to the real-time video feed 120. The zone 122 overlaid on the real-time video feed 120 and the floor plan 126 can represent the same area of the distribution network environment. In some embodiments, the operator indicates the boundary of the zone 122 over each of the real-time video feed 120 and the floor plan 126 individually. In some embodiments, the operator indicates the boundary of the zone 122 on one of the real-time video feed 120 or the floor plan 126 and the zone 122 is automatically overlaid on the other of the real-time video feed 120 or the floor plan 126 by the machine vision system 100. The floor plan 126 can be sized such that one pixel is equal to one square inch or another size. The floor plan 126 can include x and y coordinates with one corner of the floor plan (e.g., the top left corner) corresponding to the x, y coordinates of 0, 0. In some embodiments, the machine vision system 100 can draw zones based on a floorplan, an identification of a dock area, a staging area, at a threshold distance around processing equipment at a facility, at a threshold distance around a vehicle, such as an automated guided vehicle (AGV), a forklift, or the like, or according to other parameters of a facility floorplan.

The sensor frame (e.g., camera frame) that provides the real-time video feed 120 can be geo-referenced to the physical dimensions of the distribution network environment. In some embodiments, an operator can measure distances between features (e.g., fixed features) of the distribution network environment to geo-reference. In some embodiments, the machine vision system 100 can automatically geo-reference, which may include referencing known distances between features of the distribution network environment from the floor plan of the distribution network environment and recognizing those same features in the sensor frame. By geo-referencing, the machine vision system 100 can place objects detected by the one or more sensors on the floor plan 126. In some embodiments, the machine vision system 100 can accommodate for lens aberration of the sensor (e.g., camera).

Figure 3:
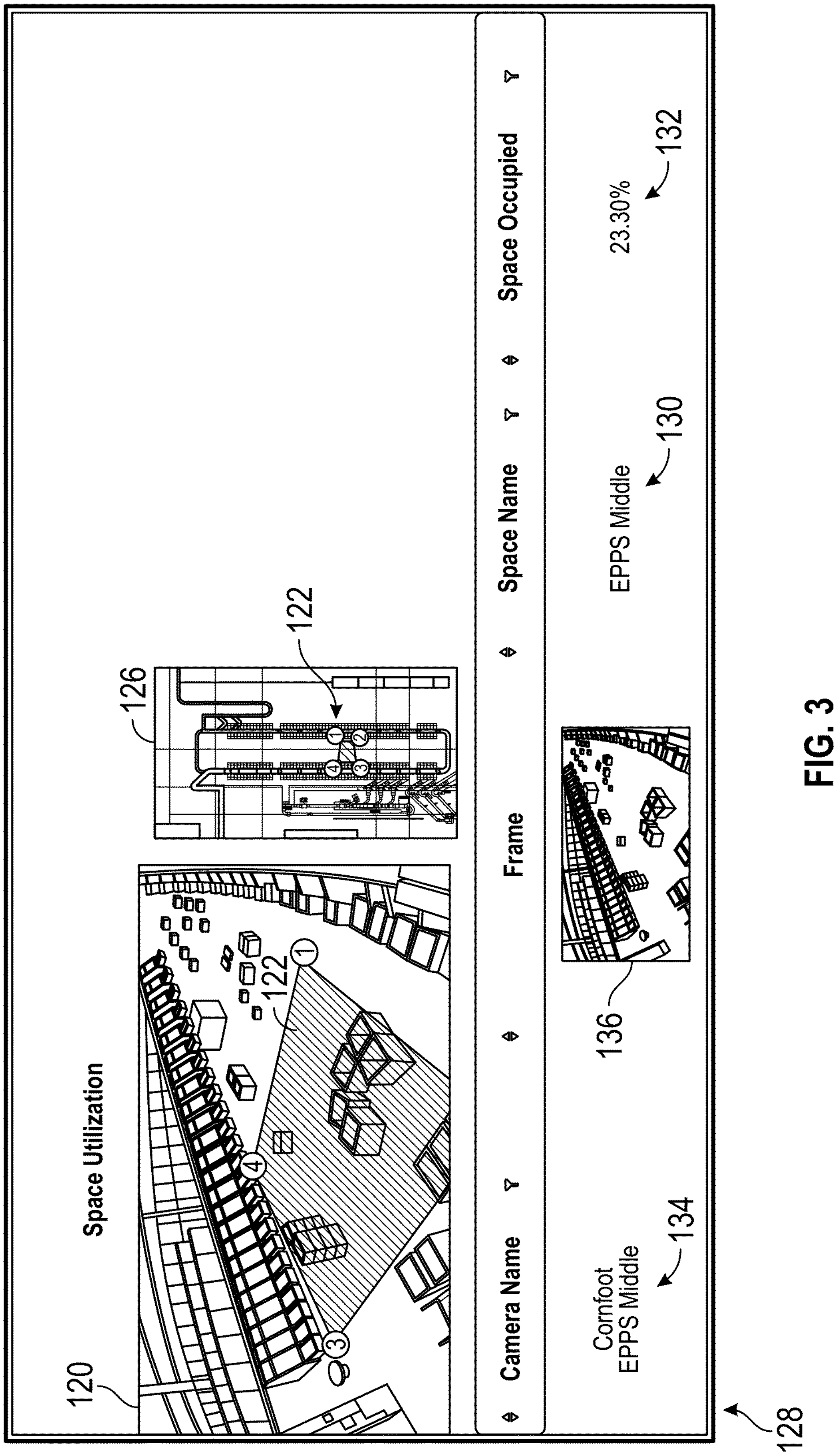
FIG. 3 illustrates an exemplary graphical user interface displaying space utilization for a zone.

FIG. 3 illustrates an example graphical user interface 128 that can be displayed on the display 114. The graphical user interface 128 can show space utilization data to the operator monitored by the machine vision system 100. As shown, the graphical user interface 128 can show a real-time video feed 120, floor plan 126, and zone 122 overlaid on each of the real-time video feed 120 and floor plan 126. For each zone 122, the graphical user interface 128 can display a camera name 134 associated with a camera capturing the real-time video feed 120 for the zone 122, a frame 136 of the real-time video feed 120, a zone name 130, and an occupation level 132. The occupation level 132 can be a percentage (e.g., 23.30%) of the zone 122 that is occupied. In some embodiments, the occupation level 132 can be a percentage of the zone 122 that is unoccupied. In some variants, the occupation level 132 can be indicated with a score (e.g., 1, 2, 3, etc.), fraction, and/or using other methods. The occupation level 132 can be determined based on the occupied portion of the usable portion (e.g., floor space) of a zone 122. For example, if a zone 122 includes one thousand square feet of usable floor space (e.g., floor space not otherwise occupied and designated as usable floor space), the occupation level 132 of the zone 122 may be 60% if six hundred square feet of usable floor space is occupied by items, assets, etc. The graphical user interface 128 can display the information detailed above for each zone 122 and be sortable by at least the camera name 134, zone name 130, and occupation level 132. For example, the zones 122 can be ordered based on occupation level 132 from most occupied to least occupied or least occupied to most occupied.

The occupation levels 132 of the zones 122 can be monitored to identify inefficiencies (e.g., underutilization and/or over-utilization of one zone over another, etc.). For example, the machine vision system 100 can track the occupation levels 132 of the zones 122 and identify those that are below a lower threshold level or above an upper threshold level for a duration of time and/or in an instance in time. The operator or system may indicate lower and upper threshold levels and/or a duration time to flag under-utilization or over-utilized of a zone. For example, the operator may indicate a lower threshold level of 20% for ten hours or more as the criteria for flagging a zone as under-utilized. The operator may indicate an upper threshold level of 95% for fifteen or more hours as the criteria for flagging a zone as over-utilized. Based on the over or under utilization of a zone, the machine vision system 100 may determine alternative processing procedures to better utilize the zones of the distribution network environment. The thresholds for zones and/or durations of time may change based on time of day, time of year, conditions at the distribution network environment, etc.

In some embodiments, the operator or system may indicate an upper threshold, that if reached, triggers an over-utilization notification or imminent grid-lock notification regardless of the duration or for a relatively short duration of time (e.g., 30 seconds, 1 minute, 2 minutes, etc.). This can be especially beneficial for zones corresponding to a dock area, movement path, etc. that, if blocked, could significantly impact the efficiency of a distribution network environment. For example, for a zone corresponding to a dock area, the operator may indicate an upper threshold of 85% for a one minute duration as the criteria for triggering an imminent grid-lock notification. The imminent grid-lock notification may correspond to an operator being visually notified by way of the display, audibly notified, notified by way of haptics, and/or using other techniques. The imminent grid-lock notification may prompt an operator to retrieve items, assets, and/or other things from the corresponding zone 122. In some embodiments, the imminent grid-lock notification may prompt the machine vision system 100 to summon an asset, such as an AGV, to retrieve items, assets, and/or other things from the corresponding zone 122 to prevent a grid lock.

In some embodiments, the machine vision system 100 may make suggestions to an operator or may automatically determine how to better or more efficiently utilize the various zones of a distribution network environment. For example, for an underutilized zone, the machine vision system 100 nay recommend that some items be routed through the underutilized zone instead of an over utilized zone. In some embodiments, the machine vision system 100 may make suggestions to an operator regarding how to better utilize assets, such as operators, AGVs, forklifts, etc., based on the utilization of the various zones. For example, the machine vision system 100 may recommend that operators, AGVs, forklifts, etc. be routed more frequently to zones with higher occupancy levels than those with lower occupancy levels. In some embodiments, the machine vision system 100 may automatically make changes to processes, at least including the foregoing, based on zone utilization.

Figure 4:
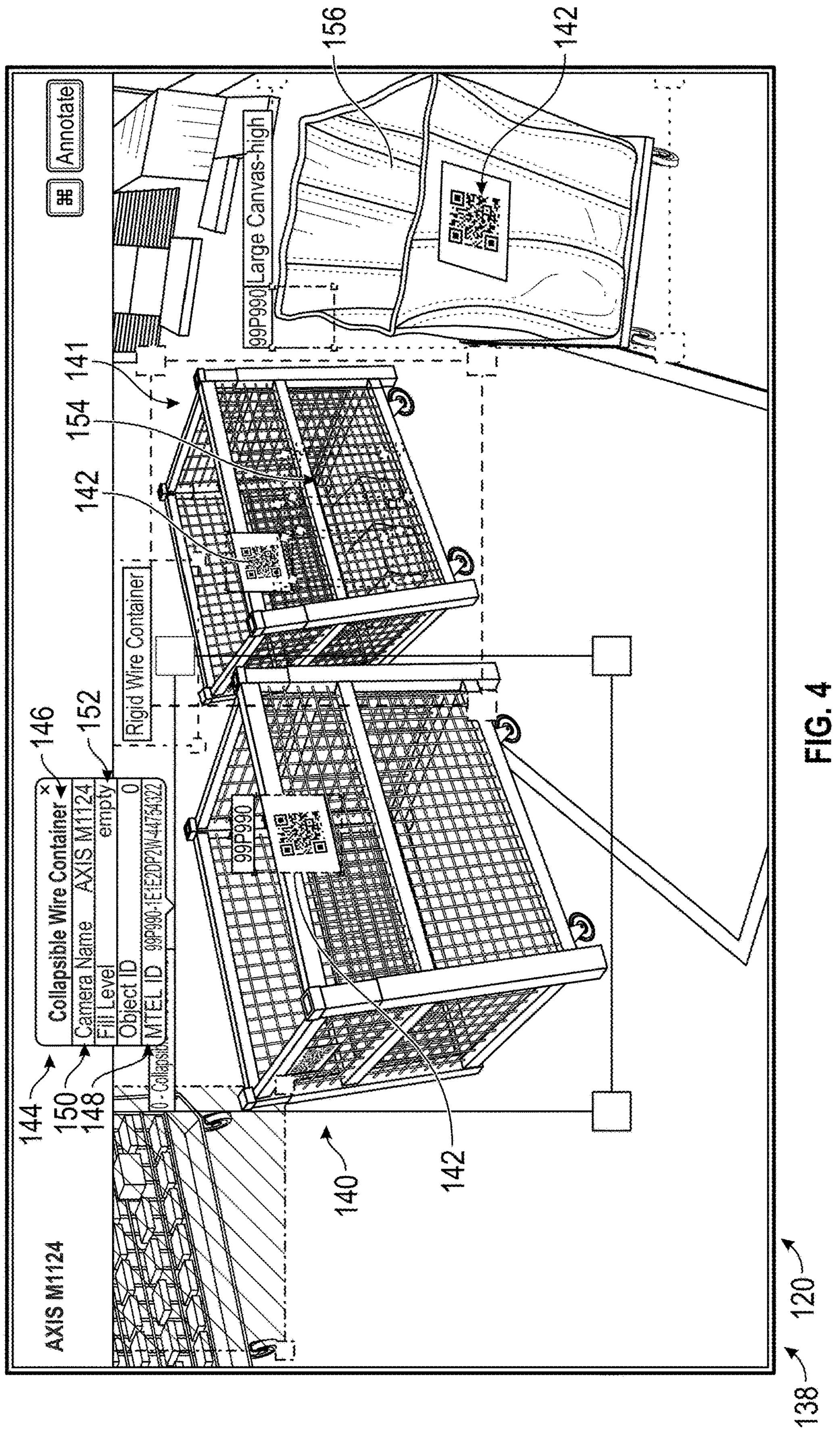
FIG. 4 illustrates an exemplary graphical user interface displaying a real-time video feed with an item container identified and information displayed for the item container.

FIG. 4 illustrates an example overlay 138 that can be displayed on the display 114. As illustrated, the machine vision system 100 can recognize items and/or assets (e.g., parcels, packages, containers, bins, shelves, equipment, pallets, AGVs, forklifts, operators, etc.) from sensor input. The machine vision system 100 upon analyzing an image from a sensor may identify an object using an algorithm such as a machine learning model or AI model. The machine vision system 100 may then access a reference library of types of items and/or assets and recognize the assets or items in the view of the one or more sensors as items and/or assets from the reference library. For example, as illustrated, the machine vision system 100 has recognized a collapsible wire container 140, rigid wire container 141, and large canvas container 156. The machine vision system 100 may recognize items, such as the collapsible wire container 140, rigid wire container 141, and large canvas container 156, and/or assets (e.g., AGVs, forklifts, operators, etc.) based on their characteristics. The sensors may also recognize or identify an asset or item by reading a computer readable code disposed on the items and/or assets. For example, as illustrated, each of the collapsible wire container 140, rigid wire container 141, and large canvas container 156 include a placard 142 with a computer readable code that can be read by the machine vision system 100 with the sensor input to provide information. Based on the computer readable code, the machine vision system 100 may identify the item and/or asset, identify a unique identification number for the item and/or asset, the destination of the item and/or asset, the route for the item and/or asset, a categorization of the item and/or asset, etc. In some embodiments, the computer readable code can include a passive or active radio frequency identification (RFID) component, such as an RFID tag, a Bluetooth® low energy tag, etc., which can broadcast an identifier that identifies the specific or unique container. The machine vision system 100 can detect and interpret the identifier, for example, by querying a database of container identifiers, and can display the container information on the display 114.

As illustrated, the machine vision system 100 may display item information 144 for each item or, in the case of an asset, asset information. The item information 144 may be displayed in a graphic, such as a pop-up, to be reviewed by an operator. The item information 144 may be displayed automatically or when the operator selects an item or asset on the real-time video feed 120, which can include indicating the item or asset in the real-time video feed 120 with a pointer. The item information 144 may at least include the item or asset type 146. For example, the item type 146 associated with the collapsible wire container 140 is collapsible wire container.

The item information 144 may include a camera name 150, which may be the name of the camera associated with the real-time video feed 120 showing the item or asset. The item information 144 may include a unique identification 148 for the item or asset. The unique identification 148 may be identified by the machine vision system 100 from reading the placard 142 on the item or asset. Because several items and/or assets of the same type may be in a distribution network environment (e.g., fifty collapsible wire containers, AGVs, etc.), the unique identification 148 may enable the machine vision system 100 to track items and assets as the items or assets moves around the distribution network environment and out of the field of view of one sensor (e.g., first camera) and into the field of view of another sensor (e.g., second camera).

In some embodiments, the machine vision system 100 may identify items and assets based on the unique characteristics of the items and assets, which can enable the machine vision system 100 to track the items and assets as the items and assets move around the distribution network environment both within a facility and in various facilities of the distribution network. For example, a collapsible wire container may have unique wear patterns, rust, color, and/or other uniquely identifiable features that can enable the machine vision system 100 to track the collapsible wire container as the collapsible wire container moves around the distribution network environment, which can include moving from the field of view of one sensor and into the field of view of another sensor and/or from one zone to another zone. The machine vision system 100 may identify the unique characteristics of an item in an image of the zone and may compare the detected characteristics of the item in the zone to characteristics stored in a memory or data structure, using a comparison algorithm, a machine learning algorithm, and the like. When the unique characteristics of the item in the image of the zone are matched to stored characteristics or when the machine learning model recognizes the pattern of unique characteristics in the image, an associated stored item identifier for the item having the detected characteristics can be determined. The machine vision system 100 may monitor the movement of items and assets, which may include determining when the items and assets are leaving one zone and entering another, using the unique identification 148 and/or unique characteristics of the items and assets to differentiate items and assets from each other. The machine vision system 100 may track all of the items and assets in a given zone, enabling the operator to access a record of all items and assets currently in a zone, when items and assets entered and/or left a zone, etc.

The item information 144 can include a fill level 152 of the item (e.g., container). The machine vision system 100 can, by way of the sensor input, determine to what level an item is filled and/or to what level an item is unfilled. The machine vision system 100 can monitor the fill level of the item to determine usage over time, monitor capacity levels of the distribution network environment, determine when to prompt an asset to move the item (e.g., prompt an operator or AGV to retrieve an item, such as an item container, when full), etc. The machine vision system 100 can communicate the fill level of the item to the operator or to another system or component in the machine vision system. For example the machine vision system 100 may indicate a percentage filled or percentage unfilled (e.g., 0%, 10%, 20%, 30%, etc.), a fraction filled or fraction unfilled (e.g., 0, 1/10, 2/10, 3/10, etc.), a descriptive indication (e.g., empty, low, medium, high, full, etc.), a graphical indication (e.g., illustrative gauge indicating the fill level, color indications, etc.), etc. As illustrated, because the collapsible wire container 140 is empty, the item information 144 associated with the collapsible wire container 140 indicates the fill level 152 as "empty." The same and/or similar techniques can be applied to assets. The machine vision system 100 may determine the usage capacity of an asset, such as a forklift, AGV, operator, etc., in use. For example, the machine vision system 100 may determine, by way of sensor input, that an AGV is towing one item container, which may be one-fourth of the towing capacity of the AGV, and based on that determination, the machine vision system 100 may display that information to an operator and/or prompt the AGV and/or an operator to couple additional item containers to the AGV to more efficiently use the AGV.

The machine vision system 100 may identify and monitor items carried by items (e.g., item containers). For example, the rigid wire container 141 shown in FIG. 4 is carrying a plurality of items. The machine vision system 100, by interpreting the sensor input, identifies the items as orange bags 154, which can enable the machine vision system 100 and/or operator to identify items and monitor the location of items in the distribution network environment. In some embodiments, the machine vision system 100 may read computer readable codes on the items being carried in item containers to monitor the locations of items in the distribution network environment.

The machine vision system 100 may overlay a graphic (e.g., mask), such as a box, over and/or around individual items and/or assets. For example, as illustrated in FIG. 4, a boundary of a black box is displayed around each of the collapsible wire container 140 and rigid wire container 141, a boundary of a white box is displayed around the large canvas container 156, and a boundary of an orange box is displayed around each of the orange bags 154.

Figure 5:
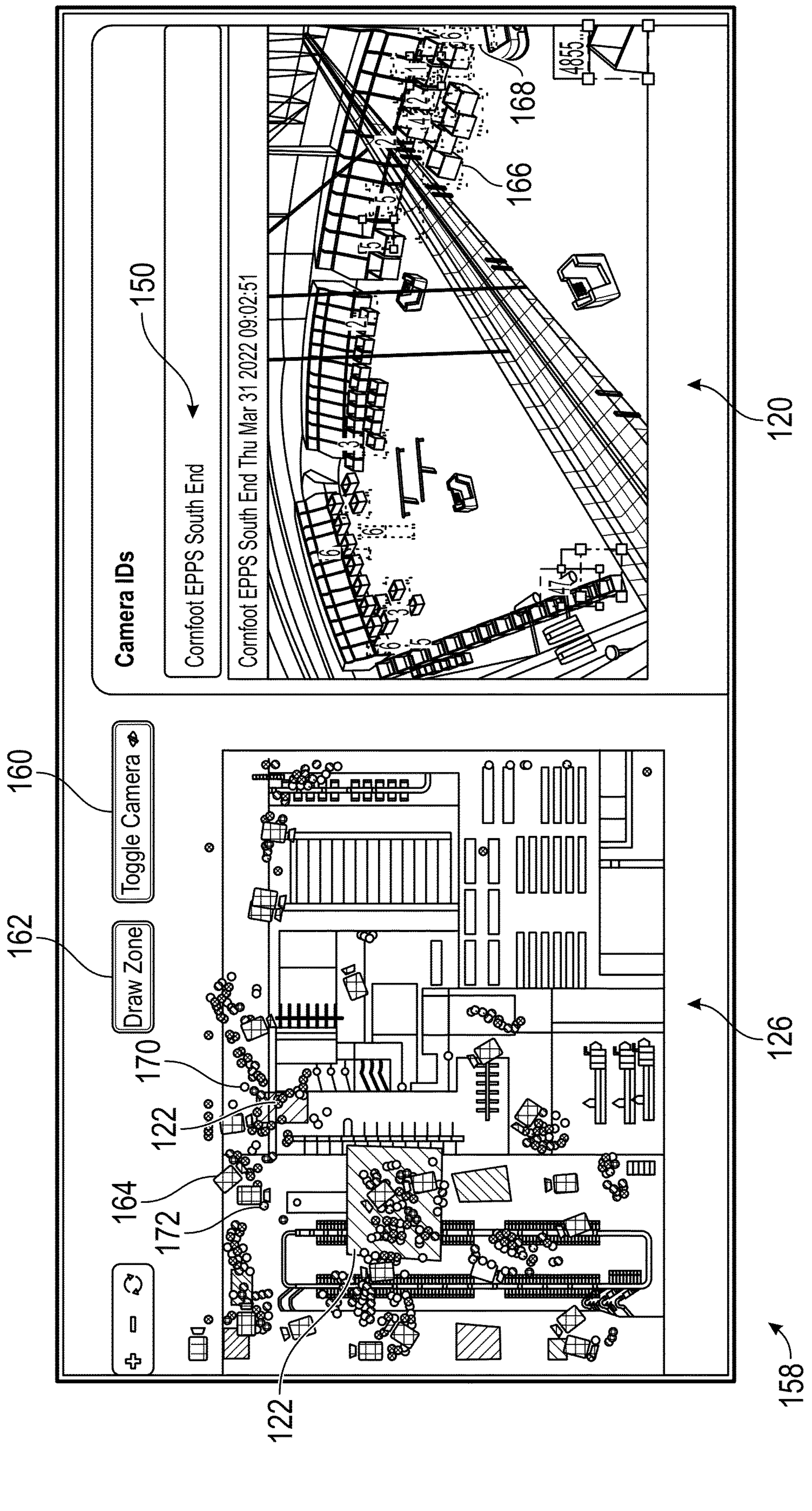
FIG. 5 illustrates an exemplary graphical user interface displaying a real-time video feed and floor plan, wherein objects detected by the sensor providing the real-time video feed are shown on the floor plan.

FIG. 5 illustrates an example graphical user interface 158 that can be displayed on the display 114. As illustrated, the graphical user interface 158 can display a real-time video feed 120 and/or the floor plan 126, which can include simultaneously displaying the real-time video feed 120 and floor plan 126. As described herein, the machine vision system 100 can identify and monitor items and/or assets in the fields of view of the various sensors distributed throughout the distribution network environment and spatially locate items and/or assets in the distribution network environment. As shown in the real-time video feed 120, the machine vision system 100 can overlay item indicator graphics 166 on and/or proximate items in the real-time video feed 120 and overlay asset indicator graphics on and/or proximate assets in the real-time video feed 120, which can include an operator indicator graphic 168 on operators in the real-time video feed 120. As the items and assets move around the distribution network, the overlaid indicator graphics in the real-time video feed 120 can move with them.

The item indicator graphics 166 and asset indicator graphics can include different colors to enable an operator to quickly distinguish the category of an item or asset on the real-time video feed 120. For example, a wire container may be associated with a white box for the item indicator graphic 166 and an operator may be associated with a green box for the operator indicator graphic 168. In some embodiments, other indicators, such as different symbols, can be used to differentiate between various categories of items and assets.

The real-time locations of items and assets in the distribution network environment can be represented on the floor plan 126. The sensors distributed throughout the distribution network environment can enable the machine vision system 100 to identify and spatially locate the items and assets in the distribution network environment. A graphical representation of the identified and spatially located items and assets can be positioned on the floor plan 126 in positions corresponding to their real-time positions in the distribution network environment. The graphical representations represented on the floor plan 126 can be associated with the indicator graphics overlaid on the real-time video feed 120. For example, if the item indicator graphic 166 overlaid on the real-time video feed 120 for a wire container is white, the item representation 170 associated with the wire container on the floor plan 126 can be white (e.g., a white dot). In another example, if the operator indicator graphic 168 (which identifies a human operator on the facility floor) overlaid on the real-time video feed 120 for an operator is green, the operator representation 172 associated with the operator on the floor plan 126 can be green (e.g., a green dot). Alternatively, or in addition to using corresponding colors, corresponding symbols, including alphanumeric symbols, can be used as well. In some embodiments, an operator can indicate an item or asset in the real-time video feed 120 and, in response, the machine vision system 100 may indicate (e.g., highlight) the corresponding item or asset representation in the floor plan 126. In some embodiments, the operator can indicate an item or asset in the floor plan 126 and, in response, the machine vision system 100 may show a real-time video feed 120 showing the item or asset and/or highlight the item or asset in the real-time video feed 120. The graphical user interface 158 may indicate the camera name 150 associated with the real-time video feed 120.

The floor plan 126 may include sensor graphics 164 (e.g., camera graphics) that represent the location and/or orientation of sensors in the distribution network environment. In some embodiments, the sensor graphic 164 for the sensor associated with the real-time video feed 120 (e.g., providing input for the real-time video feed 120) may be indicated by the machine vision system 100 (e.g., highlighted, etc.). This can enable an operator to quickly identify the location of the sensor associated with the real-time video feed 120 in the distribution network environment. In some embodiments, an operator may indicate (e.g., select) a sensor graphic 164 to display a real-time video feed 120 with input from the corresponding sensor. In some embodiments, the operator may input a sensor name (e.g., camera name) to display the real-time video feed 120 associated with the sensor. In some embodiments, the operator can toggle between various sensors of the machine vision system 100 by interacting with (e.g., indicating) a toggle camera button 160 of the graphical user interface 158. By interacting with the toggle camera button 160, the machine vision system 100 can display the real-time video feed 120 associated with another sensor different than the current.

The machine vision system 100 can display various zones 122 on the floor plan 126. As described herein, the various zones 122 can be monitored by the machine vision system 100. For example, activity within a zone 122 can be monitored (e.g., logged) to maintain and/or improve efficiency, safety, etc. In some embodiments, the operator may select a zone 122 on the floor plan 126 and, in response, the machine vision system 100 may display a real-time video feed 120 of the zone 122. The zones 122 can be represented in the real-time video feeds 120, which can include displaying one or more real-time video feeds 120. The operator may create new zones in the distribution network environment. The graphical user interface 158 may include a draw zone button 162 to enable an operator to create a new zone and/or edit the boundaries of a pre-existing zone.

Figure 6:
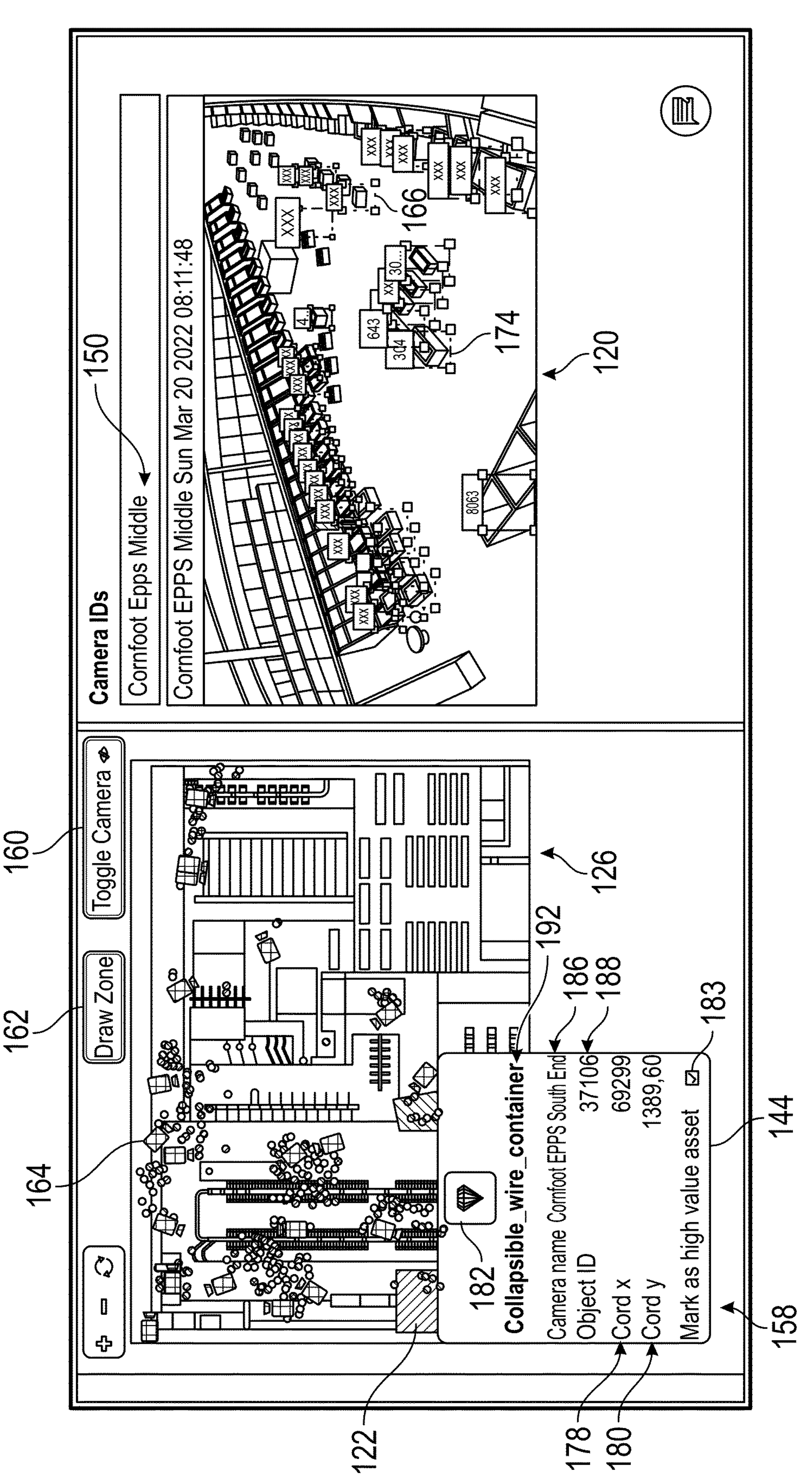
FIG. 6 illustrates an exemplary graphical user interface displaying a real-time video feed and floor plan with a high value asset identified.

FIG. 6 illustrates the graphical user interface 158 with item information 144 displayed for a high value item. The item information 144 may be display in response to an operator selecting an item representation 170 on the floor plan 126. In some embodiments, the operator may request that the machine vision system 100 display the item information 144 for one or more high value items. As described herein, the machine vision system 100, in some embodiments, may display information regarding assets such as AGVs, forklifts, tugs, operators, etc. The item information 144 may include a high value item symbol 182 to visually indicate that the item associated with the item information 144 is of high value. The operator may change the status of an item from high value to not and the other way around by interacting with a high value item toggle 183. In some embodiments, the system 100 may determine an item is a high value item based on identifying the container, type of container, or the unique identifier on or associated with the container. Once the system 100 determines that an item is a high value item, the system 100 may automatically identify the high value container in a different color and/or with the high value item symbol 182 on the display of the floorplan 126.

The item information 144 may indicate an object type 192 (e.g., collapsible wire container). The item information 144 may indicate a sensor name 186 for the sensor (e.g., camera) that currently has the item associated with the item information 144 in its field of view. For example, as illustrated, the item information 144 indicates "Cornfoot EPPS South End" to indicate that the item associated with the item information 144 is in the field of view of the camera named Cornfoot EPPS South End. This EPPS (enhanced package processing system) is used as an example of a zone or piece of item processing equipment that can be used with the systems and methods described herein, and is not limiting. One of skill in the art would understand that the systems and methods described herein can be used with other zones and other types of equipment without departing from the scope of this disclosure.

The item information 144 may indicate an object ID 188. The object ID 188 may be the same as the unique identification 148. The object ID 188 may be an identifier, such as an identification number, assigned by the machine vision system 100 for the associated item based on unique characteristic of the item. For example, the machine vision system 100 may assign an identification number to a collapsible wire container with a specific wear pattern such that, as the collapsible wire container moves around the distribution network environment and from the field of view of one sensor to another, the machine vision system 100 recognizes the collapsible wire container as having the assigned identification number.

The item information 144 may indicate an x coordinate 178 and y coordinate 180. The x coordinate 178 and y coordinate 180 may indicate the position of the item in a coordinate system for the floor plan 126, which can enable an operator, AGV, etc. to quickly locate the item in the distribution network environment. In some embodiments, the machine vision system 100 may locate an object within the distribution network environment within two inches of accuracy. The x and y coordinate for an object may be based on the center of the object.

Figure 7:
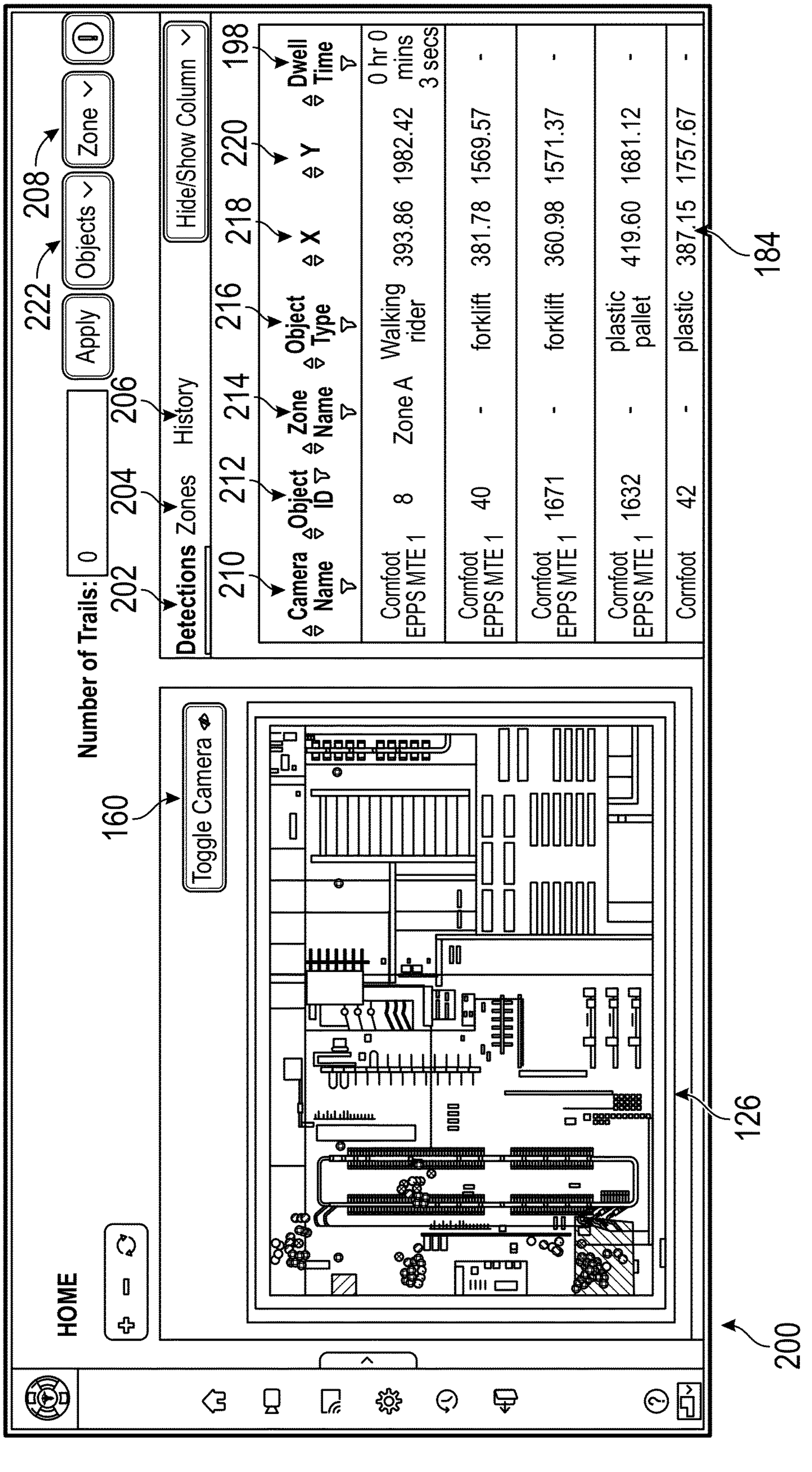
FIG. 7 illustrates an exemplary graphical user interface displaying a floor plan and log displaying detections for the floor plan.

FIG. 7 illustrates a user interface 200. The user interface 200 may display a floor plan 126 and/or log 184, which may also be referred to as a record, present and/or historical data, etc. The log 184 may include data regarding the present and/or historical data for the items and/or assets in the distribution network environment. The present and/or historical data may be organized in a variety of manners. For example, the operator may select the detections 202 to view all detections by the machine vision system 100 in the distribution network environment, as shown in FIG. 7.

As illustrated in FIG. 7, the user interface 200 may display a current list of all items and/or assets detected by the machine vision system 100 in the distribution network environment. The operator may choose to view all detected items and/or assets by indicating detections 202. For each detected item or asset, the machine vision system 100 may log a variety of present and/or historical data, as shown in the log 184. The log 184 may indicate the sensor name 210 (e.g., camera name) detecting the item or asset, the object identification 212 (e.g., identification number) for the detected item or asset, the zone name 214 where the item or asset is detected, the x coordinate 218 and y coordinate 220 for the item and/or asset, and the dwell time 198 for the item or asset. For dwell time 198, the log 184 may indicate how long an item or asset has been in a zone. The data in the log 184 may be organized (e.g., sorted) by operator preference. The data can be organized (e.g., sorted) by sensor name 210, object identification 212, zone name 214, object type 216, x coordinate 218, y coordinate 220, and dwell time 198. The operator can choose to remove one or more of the data types from being displayed in the log 184. For example, the operator may choose to not show the camera name 210.

The operator may indicate zones 204 to display data for the items and/or assets in the zones of the distribution network environment. This can enable the operator to view data for items and/or assets in a specific zone of the distribution network environment and not other zones. In some embodiments, the operator or system may indicate zones 204 to see data for all the zones but not data for objects outside the zones.

The operator may indicate history 206 to display historical data for the items and/or assets in distribution network environment. This can enable a user to review data regarding items and/or assets in a zone. This can enable a user to review the detected movement of an item and/or asset throughout the distribution network environment.

The operator may interact with an object selection interface 222 to select an item or asset type (e.g., AGV, wire container, operator, canvas container, etc.). In response, the machine vision system 100 may display data for the selected item or asset type. For example, if an operator selects wire container, the log 184 will display data for wire containers in the distribution network environment, which can at least include the data illustrated in log 184 as shown in FIG. 7.

The operator may interact with a zone selection interface 208 to select a zone. In response, the machine vision system 100 may display data for the selected zone. For example, if an operator selected Zone A, the log 184 will display data for items and/or assets detected by the machine vision system 100 in Zone A.

Figure 8:
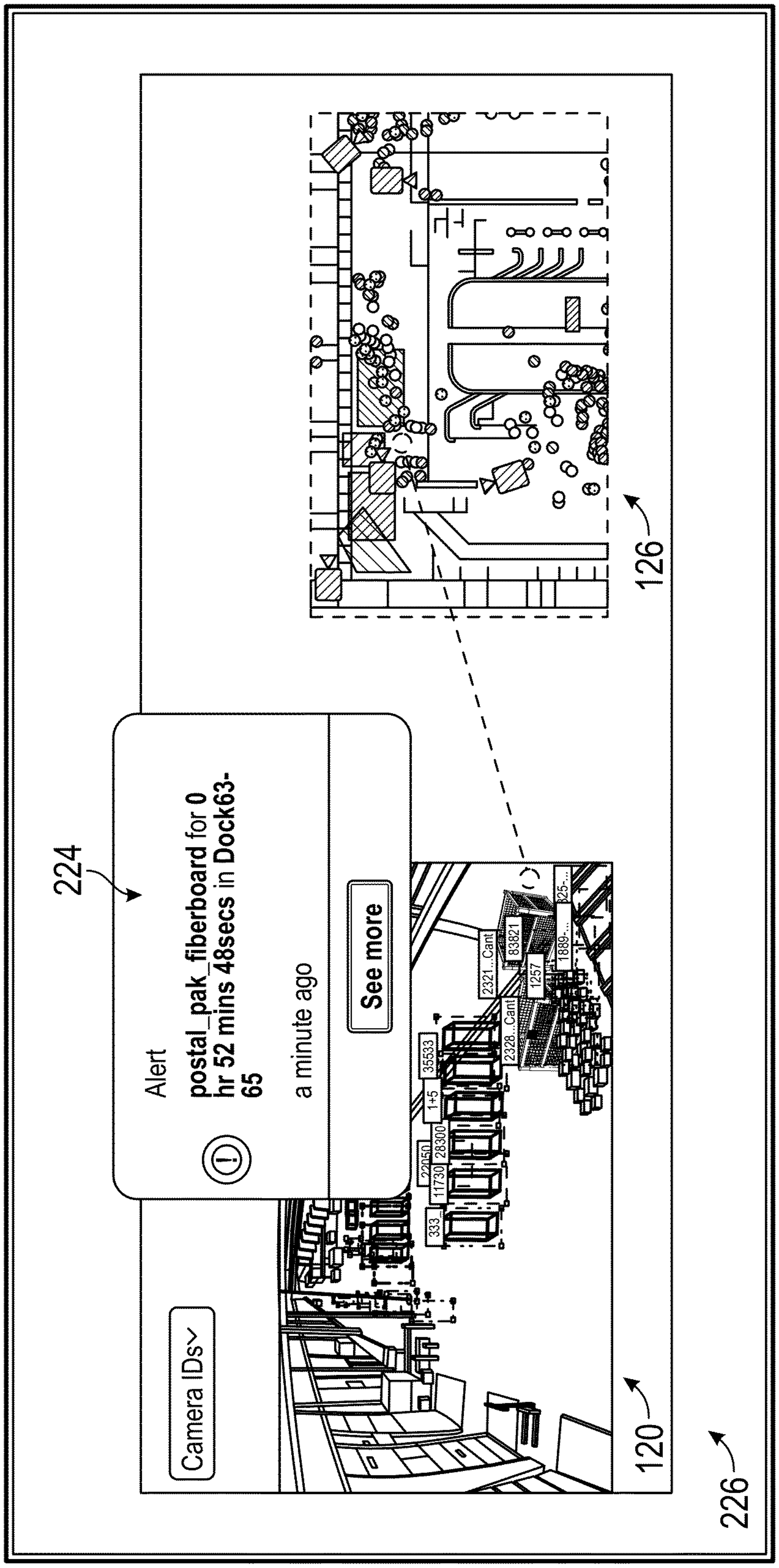
FIG. 8 illustrates an exemplary graphical user interface displaying a real-time video feed and floor plan with an alert notification.

FIG. 8 illustrates a graphical user interface 226. The graphical user interface 226 may include a real-time video feed 120 and/or floor plan 126. As illustrated, the machine vision system 100 has generated an alert notification 224. The machine vision system 100 may generate an alert notification 224 in response to detecting a variety of events. For example, the machine vision system 100 may generate an alert notification 224 if the occupancy of a zone is above or below a threshold, if an item or asset is detected in an unplanned zone or an incorrect location, if an item or asset has dwelled at a zone or other location for a threshold amount of time, if an item has deviated from its determined path through a facility or through the distribution network (if a container is detected on a dock but is supposed to be at a sorting machine, if an item is at an incorrect facility according to its identifier or placard, if a pallet is loaded on a truck at an incorrect dock number, etc.) and the like.

As illustrated, a postal pack fiberboard has dwelled at a location, "Docks63-65," for 52 minutes and 48 seconds, triggering the alert notification 224. The machine vision system 100 may have an upper threshold dwell time for a location that, if reached, triggers an alert notification. An alert notification can be displayed to the operator on the display 114 and/or audibly emitted to the operator. The machine vision system 100 can automatically summon an asset to take an action based on the generation of an alert notification. In some embodiments, the machine vision system 100 can automatically summon a particular type of asset based on a detected or determined container type. For example, in response to the generation of the alert notification 224 in FIG. 8, the machine vision system 100 may summon an asset, such as an AGV or operator, to retrieve the postal pack fiberboard. If, for example, the detected item is a pallet, the machine vision system 100 can automatically summon a forklift-type AGV to move the pallet to the next appropriate location in the facility. The machine vision system 100 may display more information regarding the asset or item that triggered the alert notification 224, which can at least include the information displayed in log 184 of FIG. 7.

Figure 9:
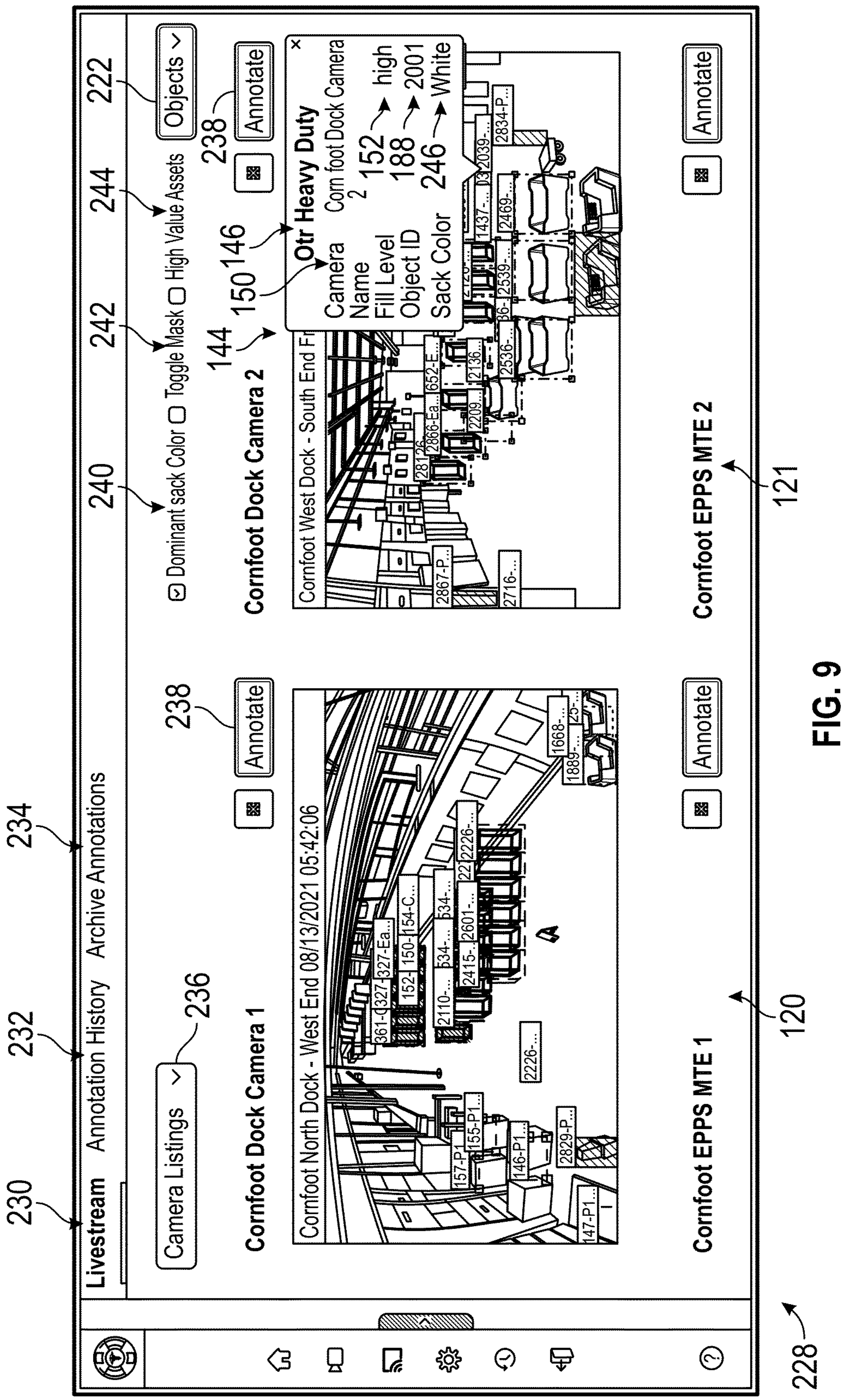
FIG. 9 illustrates an exemplary graphical user interface displaying two real-time video feeds.

FIG. 9 illustrates a graphical user interface 228. The graphical user interface 228 can include a real-time video feed 120 and a second real-time video feed 121 with livestream 230 selected. The real-time video feed 120 can correspond to a first area in the distribution network environment and the real-time video feed 121 can correspond to a second area in the distribution network environment. As described herein, the real-time video feed 120 and/or real-time video feed 121 can include various indicator graphics, which can also be referred to as overlays or masks, for the various items and/or assets in the distribution network environment. The overlays on the real-time video feed 120 and the second real-time video feed can identify items with outlines, boxes, object ID numbers, and the like, as described elsewhere herein.

The operator may annotate the real-time video feed 120 or real-time video feed 121, which may include overlaying a graphic. The operator may interact with the annotate button 238 to annotate an object in the real-time video feed 120 or real-time video feed 121 that the operator would like added to an detection library. The object detection library may be a reference library of items and/or assets (e.g., item containers, AGVs, forklifts, canvas containers, etc.) that the machine vision system 100 may recognize. If the operator would like to add a new asset or object to the detection library, the operatory may select or otherwise indicate the annotate button 238 and, with a pointer (e.g., cursor), outline the item or asset of interest and designate the type of object. The operator may indicate any key values or characteristics that are important to the object. The operator may select annotation history 232 to review past annotations, which can include editing, archiving, or deleting past annotations. The operator may select archive annotations 234 to review archived annotations, which may include editing or deleting past annotations.

The graphical user interface 228 may include sensor listings 236 (e.g., camera listings) that the operator may interact with to display one or more lists of sensors. The operator may select a sensor (e.g., camera) from the list of sensors to display a real-time video feed captured by the sensor.

An item or asset may be indicated (e.g., selected) in the real-time video feed 120 or real-time video feed 121 to display item or asset information 144. As shown in real-time video feed 121, the item information 144 may include an item type 146 (e.g., over the road heavy duty container), sensor name 150 of the sensor (e.g., camera) with the field of view capturing the real-time video feed 120 or real-time video feed 121 of the item or asset, fill level 152, object ID 188, and/or sack color 246. The sack color 246 can be indicative of a color of the one or more sacks, which may be a dominant sack color, carried by the item container or asset. The dominant sack color may be toggled on and off by the operator interacting with the dominant sack color toggle 240.

The operator may interact with a mask toggle 242 to include or omit masking. Masking may refer to overlaying graphics on the objects in the frames of the sensors providing the real-time video feed 120 and real-time video feed 121.

The operator may interact with a high value asset toggle 244 to highlight high value items in the real-time video feed 120 or real-time video feed 121. The machine vision system 100 may highlight the high value items by overlaying graphics, which can include coloring (e.g., red), on the items in the real-time video feed 120 or real-time video feed 121.

The operator may interact with an object selection interface 222 to select an item or asset type. In response, the machine vision system 100 may highlight the selected item or asset type in the real-time video feed 120 or real-time video feed 121.

Figure 10:
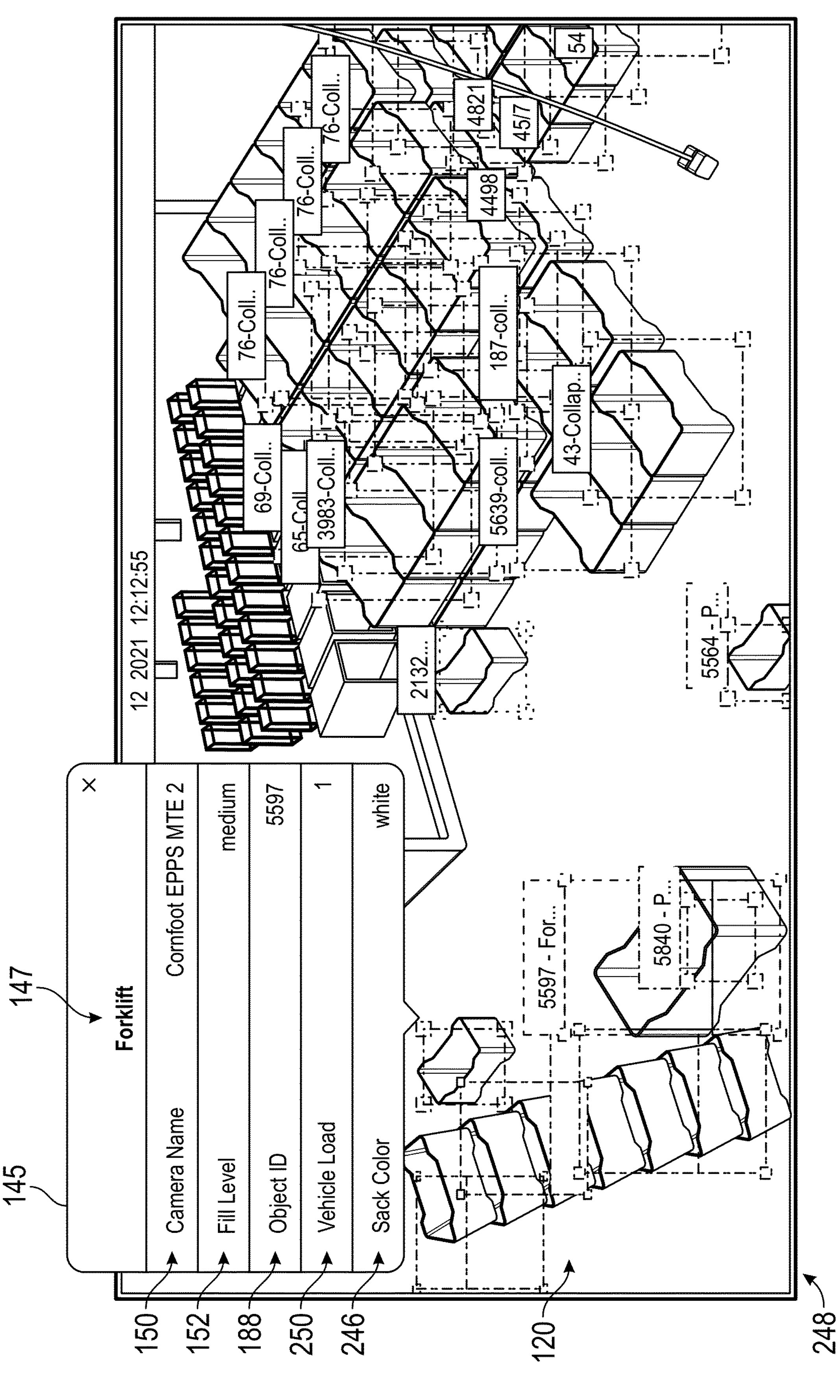
FIG. 10 illustrates an exemplary graphical user interface displaying a real-time video feed with a forklift identified and information regarding the forklift provided.

FIG. 10 illustrates a graphical user interface 248. The graphical user interface 248 can include a real-time video feed 120. As illustrated, the machine vision system 100 may show asset information 145 for an asset, such as a forklift, AGV, tug, etc. The asset information 145 may include the asset type 147 (e.g., forklift), sensor name 150 of the sensor capturing the real-time video feed 120 showing the asset, fill level 152 of the asset, object ID 188, sack color 246 held by the asset, and vehicle load 250. The fill level 152 may indicate the use level of the asset, which may at least be indicated as described herein (e.g., percentage, fraction, descriptive word, graphic, etc.). The machine vision system 100 may indicate fill level based on a comparison with a maximum use. For example, if the maximum number of items (e.g., item containers) that can be transported by the asset is six, the fill level may be full when the asset is transporting six items and medium when the asset is transporting three items. The machine vision system 100 may command or suggest an asset retrieve an additional one or more items if the number of items being transported by the asset is less than a threshold (e.g., a maximum). The machine vision system 100 may monitor the usage level of assets to determine if more or less assets, including assets of a specific category (e.g., forklift), are needed or not, and based on the monitor, the machine vision system 100 may request more or less assets, which can include assets of a specific category.

The vehicle load 250 may indicate the number of items (e.g., item containers) being transported by the asset. The machine vision system 100 may determine that an item (e.g., item container) is being transported by the asset if the asset and item are traveling at the same speed and/or direction. The machine vision system 100 may consider the proximity of the asset and the item relative to each other when determining if the item is being transported by the asset. The machine vision system 100 may monitor the efficiency of assets based on the number of items transported, which may include averaging the efficiency for individual assets, classes of assets, etc.

Figure 11:
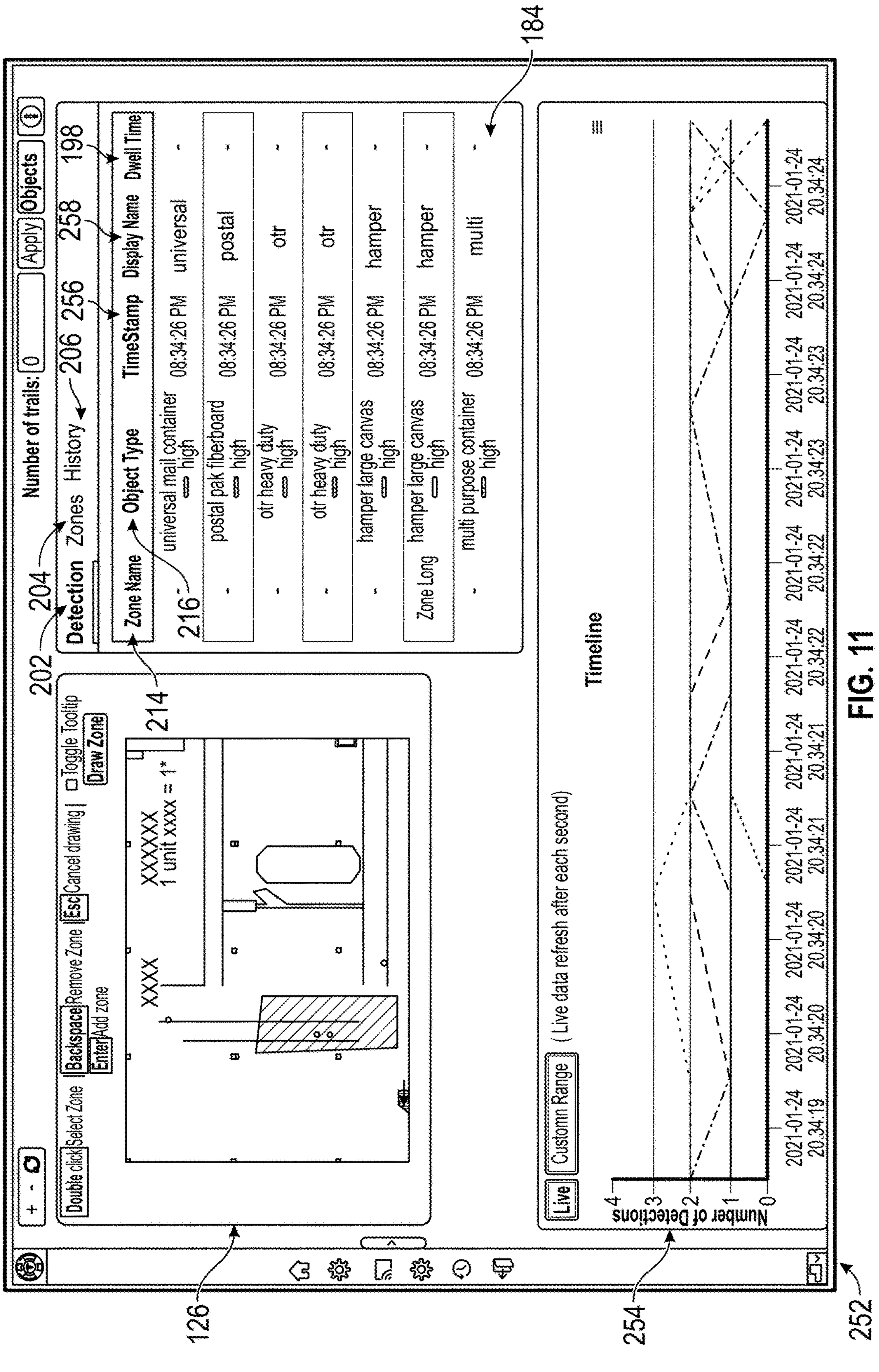
FIG. 11 illustrates an exemplary graphical user interface displaying a floor plan, log of detections, and graph of detections over time.

FIG. 11 illustrates a graphical user interface 252. The graphical user interface 252 may include a floor plan 126, log 184, and/or a graph 254. The floor plan 126 can include any of the features described herein. In some embodiments, an operator or the system may select a zone displayed in the floor plan 126, resulting in the log 184 displaying data for the selected zone. The log 184 may include any of the features described herein. In some embodiments, the log 184 may include a timestamp 256 of item and/or asset detections by the machine vision system 100. In some embodiments, the log 184 may include a display name 258, which may be an abbreviated asset or item type name.

The graph 254 may display the number of detections by the machine vision system 100 over time. The number of detections may correspond with the number of detected items and/or assets in the distribution network environment. Accordingly, if the machine vision system 100 detected fifty items and assets at a moment in time, the graph 254 may display fifty at the moment in time. In some embodiments, the graph 254 may represent detections for items, item categories, assets, and/or asset categories. For example, the graph 254 may include a separate line for different item categories and asset categories. In some embodiments, the graph 254 may represent detections in various zones. For example, the graph 254 may include a separate line for different zones. In some embodiments, the operator may select in instance in time on the graph 254 and the floor plan 126 may depict the location of items and/or assets on the floor plan 126 at that time. In some embodiments, the machine vision system 100 may playback the object detections on the graph 254 over time and, at the same time, represent the movements of objects on the floor plan 126 over the same time period.

Figure 12:
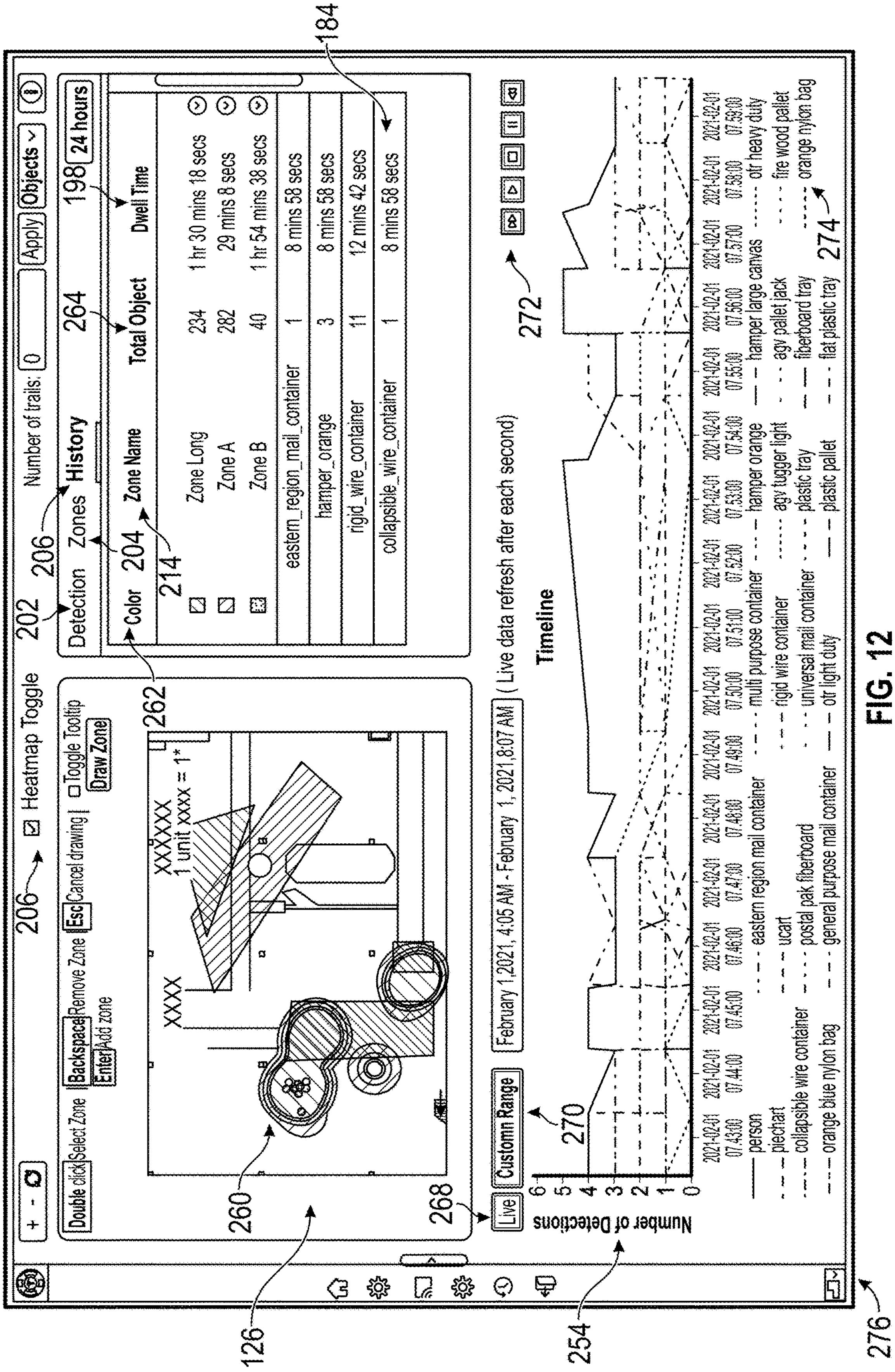
FIG. 12 illustrates an exemplary graphical user interface displaying a floor plan with a heat map, log of detections, and graph of detections over time.

FIG. 12 illustrates a graphical user interface 276. The graphical user interface 276 may include a floor plan 126, graph 254, and/or log 184. The floor plan 126 may include a heatmap overlay 260. The heatmap overlay 260 may visually represent, which may include using colors, the frequency that items and/or assets are detected in areas of the distribution network environment. For example, areas of the distribution network environment that are highly frequented may be represented with a dark red color while less frequented areas may be represented with a green color on the floor plan 126. The heatmap overlay 260 may help an operator to better utilize the distribution network environment. The heatmap overlay 260 may be toggled on and off with the heatmap toggle 266.

The log 184 is shown with the history 206 information displayed, which may at least include zone color 262, zone name 214, total objects 264, and/or dwell time 198. The zone color 262 may correspond with the color of the zone represented in the floor plan 126. The total objects 264 may indicate the total number of items and/or assets detected in the zone, which may include currently detected or historically detected. The dwell time 198 may indicate the period of time for which an item and/or asset has been detected in the zone.

The graph 254 illustrated in FIG. 12 shows the number of detections for different categories of items and assets over time. The graph 254 may include a live button 268 that may be toggled to enable an operator to view in real-time the number of detected items and assets of different category types in the distribution network environment. The graph 254 may include a range button 270 to enable the operator to indicate a date and/or time range. In response to an operator's indication, the machine vision system 100 may display historical detection data for the indicated date and/or time range. The graph 254 may include playback controls 272 that can enable the operator to play, pause, stop, rewind, and/or fast forward historical detection data over the indicated date and/or time range.

Figure 13:
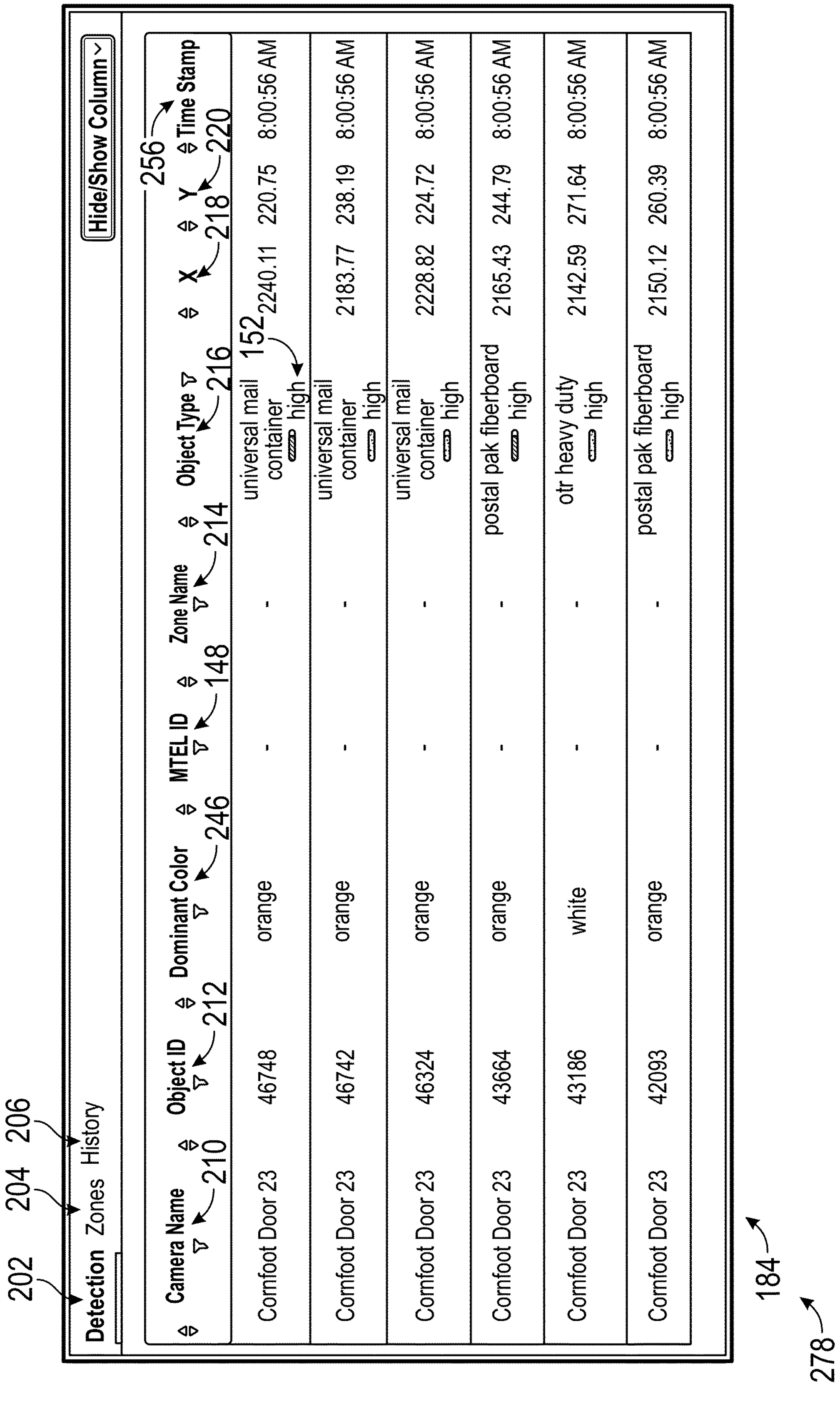
FIG. 13 illustrates an exemplary graphical user interface displaying a log of detections.

FIG. 13 illustrates a graphical user interface 278. The graphical user interface 278 can include a log 184. The log 184 may allow an operator to select between detections 202, zones 204, or history 206 to organize data for viewing. As illustrated in FIG. 13, the detections 202 is selected such that all object detection data is displayed. For each object, the log 184 may at least include, as detailed herein, camera name 210, object identification 212, sack color 246, unique identification 148, zone name 214, object type 216, x coordinate 218 and y coordinate 220, and a timestamp 256 to indicate when the provided information for the object was last updated. The sack color 246 may correspond with the dominant (e.g., predominant) sack color of the items being transported by the object. The log 184 may indicate fill level 152 for the object, which may be displayed proximate the object type 216. The fill level 152 may at least be indicated by a descriptor (e.g., high) and/or graphic (e.g., gauge representation showing amount full or empty).

The machine vision system 100 can use detections of an item or asset in a particular area and the log 184 to update or populate a tracking database. Historically it has been necessary to scan a code on containers to update the tracking system as to the location of each item. For example, when an asset arrives at a facility, an operator performs a receipt scan. Or, when a pallet is put on a vehicle, such as a truck or trailer, the operator scans the pallet and the truck or trailer the item is on. These scans are stored in a tracking database and are used for a variety of purposes. Missing scans can alert the system to issues or problems, can be used to estimate delivery or arrival times, to predict workloads, and the like. When the machine vision system 100 identifies a particular asset at a location in a facility, or moving from one location to another, the machine vision system 100 can log the location or updated location and send that information to the tracking database. This can be used in lieu of scanning each item by an operator.

Figure 14:
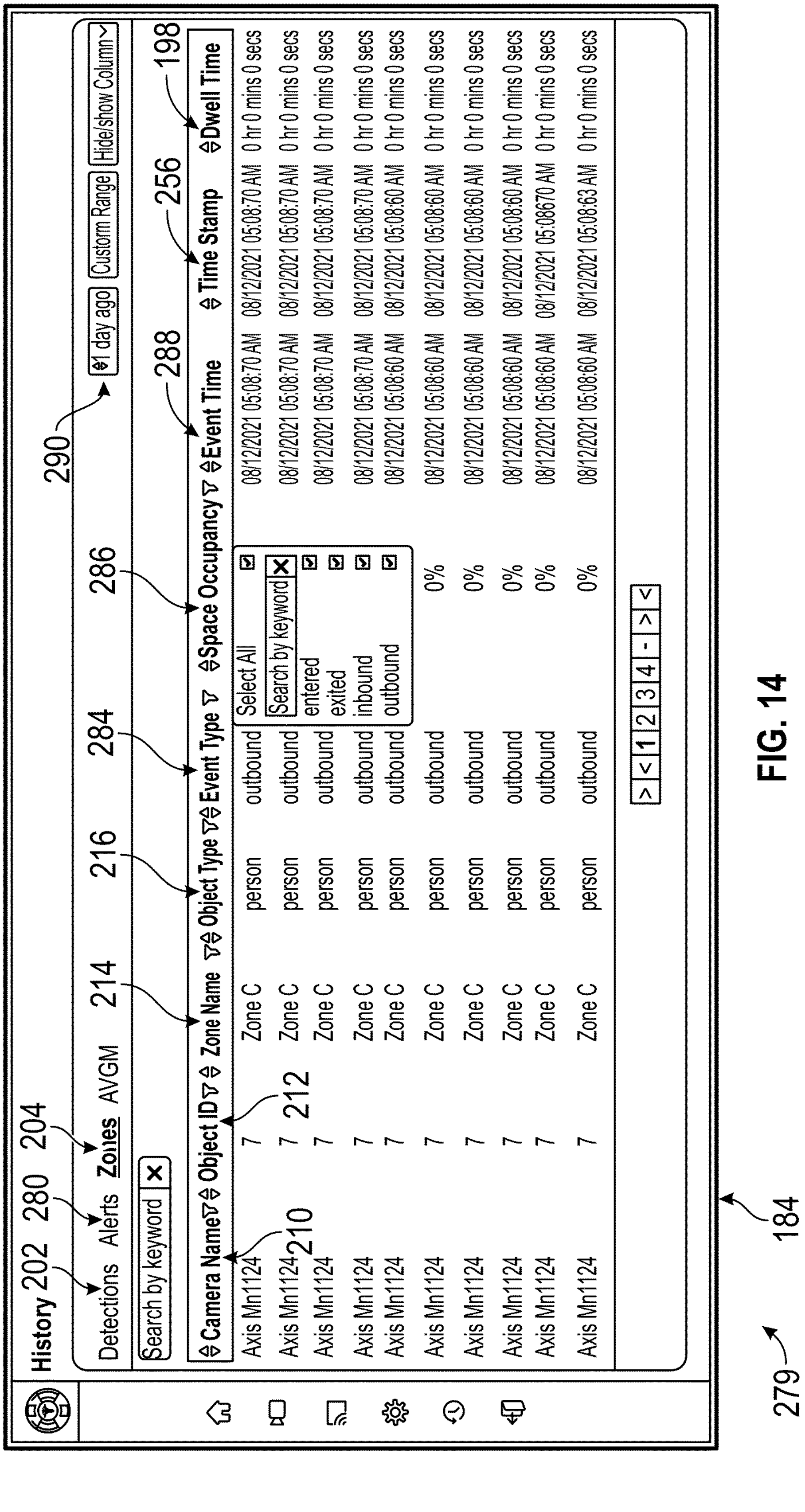
FIG. 14 illustrates an exemplary graphical user interface displaying a log of detections for a zone.

FIG. 14 illustrates a graphical user interface 279. The graphical user interface 279 can include a log 184. The log 184 may allow an operator to select between detections 202, alerts 280, and/or zones 204 to organize data for viewing. For alerts, the data for the items and/or assets can include alert types associated with items and/or assets such as absence, incorrect location, etc. The alerts can be based on any input such as relating to dwell time (e.g., dwell above a threshold) of an item or asset, space occupancy, types of items or assets, zones, spaces, categories of items or assets, time of year, time of day, and/or other factors.

As illustrated in FIG. 14, the zones 204 is selected such that the item and/or asset detection data is organized by zone. For each item and/or asset in a zone, the log 184 may include camera name 210, object identification 212, zone name 214, object type 216, event type 284, space occupancy 286, event time 288, timestamp 256, and/or dwell time 198. The log 184 may include time filters 290 to filter the data based on different time ranges.

For space occupancy 286, the log 184 may indicate how much of a zone is occupied or unoccupied. The machine vision system 100 may not route items and/or assets to zones that have space occupancy level above a threshold.

For event type 284, the log 184 may indicate if an item and/or asset has entered or exited a zone or is inbound or outbound. A zone may have one or more boundaries indicated as an inbound or outbound boundary, which can be represented on the boundaries of a zone 122 in a floor plan 126 (e.g., boundaries may be colored differently, include a label, highlighted, etc.). The operator may indicate inbound and/or outbound boundaries, which may include identifying a boundary of the zone 122 such that the boundary is a different color and/or includes another indication. As an item and/or asset approaches an inbound boundary, the log 184 may show that the item and/or asset is inbound with respect to the corresponding zone. Once the item and/or asset has crossed the inbound boundary, the log 184 may show that the item and/or asset has entered the zone. As the item and/or asset approaches an outbound boundary, the log 184 may show that the item and/or asset is outbound of the zone. Once the item and/or asset has crossed the outbound boundary, the log 184 may show that the item and/or asset has exited the zone. The inbound and outbound determinations may consider the proximity of the item and/or asset to the inbound or outbound boundary, direction of travel of the item and/or asset, processing plans, etc. The event time 288 may time stamp the occurrence of the event. The timestamp 256 may time stamp the occurrence of the event.

Figure 15:
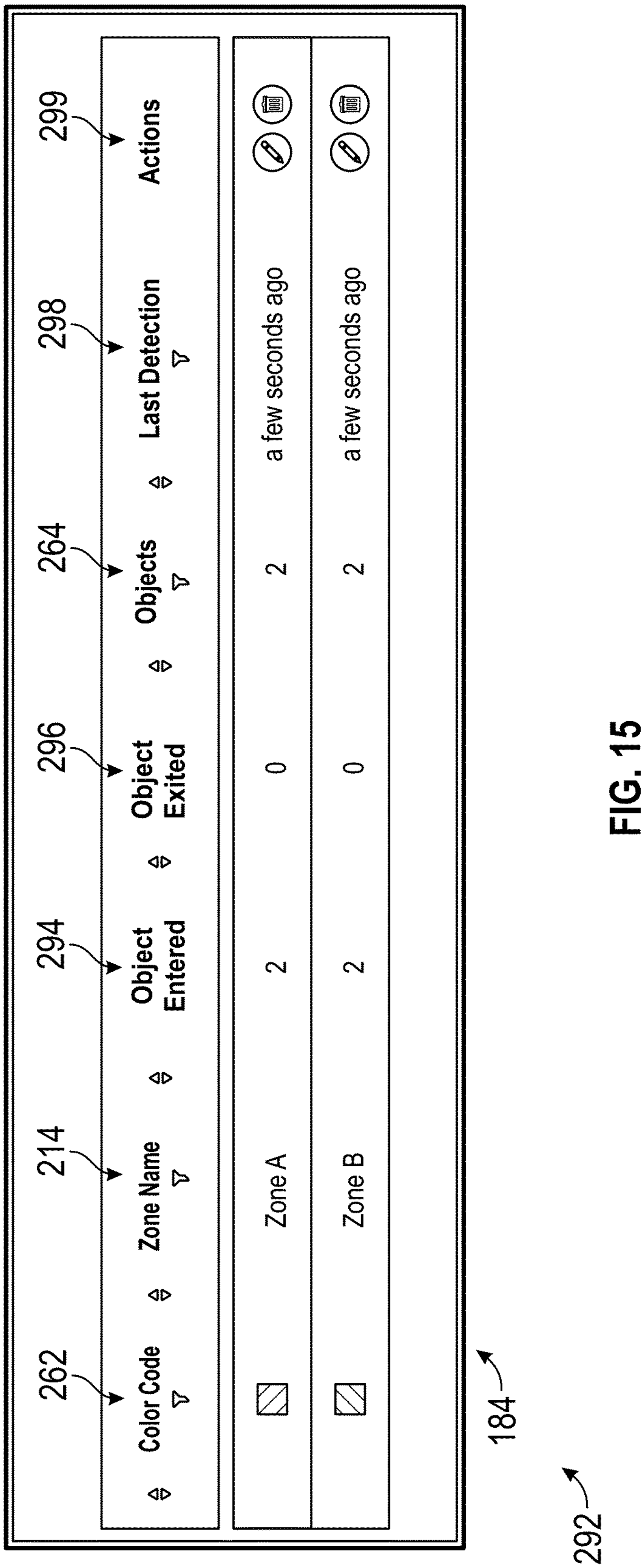
FIG. 15 illustrates an exemplary graphical user interface displaying a log for a zone.

FIG. 15 illustrates a graphical user interface 292. The graphical user interface 292 may include a log 184, which may be a zone summary. The log 184 may at least include zone color 262, zone name 214, objects entered 294, objects (e.g., items and/or assets) exited 296, total objects (e.g., items and/or assets) 264, last detection time 298, and/or actions 299. The objects entered 294 may indicate the total number of items and/or assets that have entered a zone. The objects exited 296 may indicate the total number of items and/or assets that have exited a zone. The total objects 264 may indicate the total number of items and/or assets currently in a zone, which may be determined by subtracting items and/or assets entered 294 from items and/or assets exited 296 or based on items and/or assets currently detected in the zone. The last detection time 298 may indicate the lapsed time from the last detection for the corresponding zone. The log 184 may include action options 299 that may enable an operator to edit data, add notes, delete data, etc.

Figure 16:
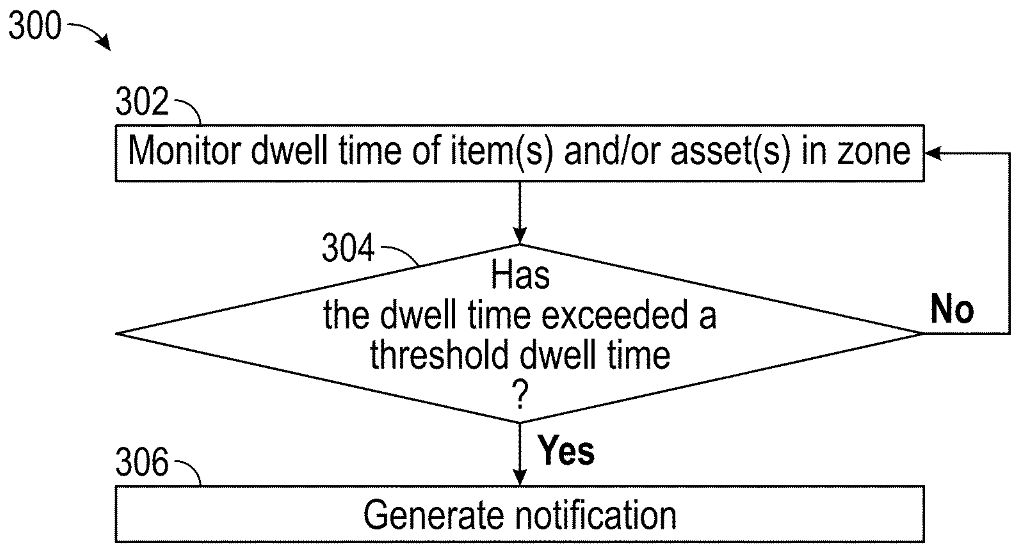
FIG. 16 illustrates an exemplary process of generating notifications based on the monitored dwell times of item(s) and/or asset(s) in a zone.

FIG. 16 is a flow diagram depicting an exemplary process 300 for generating notifications based on dwell times of item(s) and/or asset(s) within a zone. The flow diagram is provided for the purpose of facilitating description of aspects of some embodiments. The diagram does not attempt to illustrate all aspects of the disclosure and should not be considered limiting.

The process 300 begins at block 302, wherein the machine vision system 100 monitors the dwell time of one or more item(s) and/or asset(s) in a zone of a distribution network environment. The machine vision system 100 may include one or more sensors, such as a camera, that enable the machine vision system 100 to detect and recognize items and/or assets. The frame of the sensor may be mapped (e.g., georeferenced) to the physical dimensions of the distribution network environment such that the machine vision system 100 may determine the location of the detected item(s) and/or asset(s) within the distribution network environment and that the detected item(s) and/or asset(s) are indeed in the zone. The machine vision system 100 monitors the lapsed time since the item(s) and/or asset(s) were first detected in the zone (i.e., the dwell time of the items and/or assets).

The process 300 moves to decision state 304, wherein the machine vision system 100 determines if the dwell time of the item and/or asset within the zone has exceeded an upper threshold. The upper threshold may be set by an operator. The upper threshold may, in some embodiments, be set by the machine vision system 100 based on current conditions at the distribution network environment and/or historical data. The upper threshold may vary from zone to zone. For example, a zone proximate a dock door or pathway for item(s) and/or asset(s) transportation may have a relatively low upper threshold to prevent blocking the dock door or pathway, and a zone disposed away from the dock door and/or a pathway may be relatively higher. If the machine vision system 100 determines that the dwell time of the item(s) and/or asset(s) has not exceeded the upper threshold, the process 300 may return to block 302. Thresholds may change based on the time of day, time of year, conditions at the distribution network environment, quantity of assets at the distribution network environment, and/or other factors.

If the machine vision system 100 determines that the dwell time of the item(s) and/or asset(s) has exceeded the upper threshold, the process 300 moves to block 306, wherein the machine vision system 100 may generate a notification. The notification may include visual, audible, and/or haptic alerts to notify an operator of the excessive dwell time. In some embodiments, the machine vision system 100 may prompt, suggest, and/or automatically cause the retrieval of the item(s) and/or asset(s) by way of summoning an asset, such as an operator, AGV, forklift, tug, etc. For example, the machine vision system 100 may summon an AGV to retrieve the item(s) and/or asset(s) that have exceeded the dwell time. The machine vision system 100 may communicate the identity and/or location of the item(s) and/or asset(s) to the asset. The asset can retrieve and relocate the items and/or assets, which can include relocating the item(s) and/or asset(s) to a location specified by the machine vision system 100. The machine vision system 100 may determine a location based on conditions in the distribution network environment.

Figure 17:
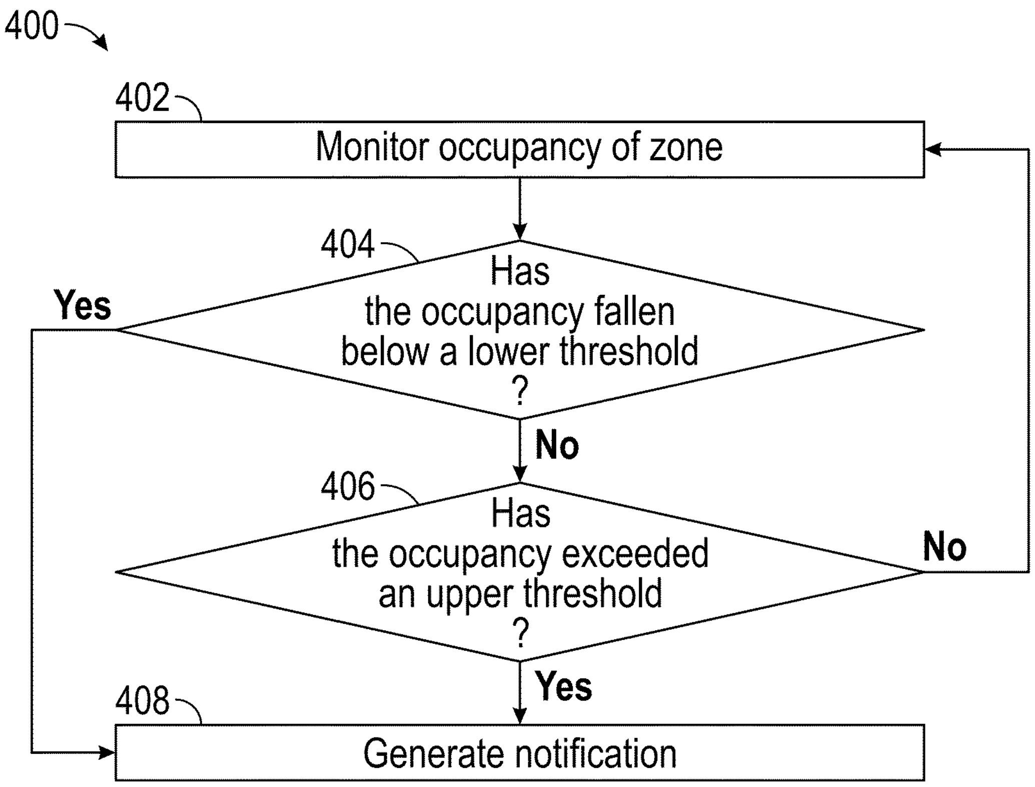
FIG. 17 illustrates an exemplary process of generating notifications based on the monitored occupancy level of a zone.

FIG. 17 is a flow diagram depicting an exemplary process 400 for generating notifications based on the occupancy of a zone. The flow diagram is provided for the purpose of facilitating description of aspects of some embodiments. The diagram does not attempt to illustrate all aspects of the disclosure and should not be considered limiting.

The process 400 begins at block 402, wherein the machine vision system 100 monitors the occupancy of a zone. The machine vision system 100 may monitor the occupancy of a zone based on the amount of floor space in a zone that is occupied and/or unoccupied. The one or more sensors of the machine vision system 100 may detect available floor space (e.g., floor space that is not occupied by items, assets, and/or other things) and/or unavailable floor space (e.g., floor space that is occupied by items, assets, and/or other things) in a zone. For example, if a zone has one thousand square feet of floor space and six hundred square feet are currently occupied by items, assets, and/or other things, the machine vision system 100 can determine that the zone has a 60% occupancy and/or 40% availability.

The process 400 proceeds to decision state 404, wherein the machine vision system 100 determines if the occupancy of the zone has fallen below a lower threshold. The lower threshold may be set by an operator. The lower threshold may, in some embodiments, be set by the machine vision system 100 based on current conditions at the distribution network environment and/or historical data. The lower threshold may vary from zone to zone. In some instances, it may be advantageous for the efficiency of a distribution network environment that the occupancy of a zone remain above the lower threshold. The lower threshold may be a quantity (e.g., 100 square feet), fraction (e.g., 1/10), percentage (e.g., 10%), and/or other metric indicative of the occupancy of the zone. Thresholds may change based on the time of day, time of year, conditions at the distribution network environment, quantity of item(s) and/or asset(s) at the distribution network environment, and/or other factors. In some embodiments, the machine vision system 100 may determine if the occupancy has fallen below a lower threshold for a period of time (e.g., one minute, one hour, three hours, etc.)

If the occupancy of the zone has not fallen below the lower threshold, the process 400 continues to decision state 406, wherein the machine vision system 100 determines if the occupancy of the zone has exceeded an upper threshold. The upper threshold may be set by an operator. The upper threshold may, in some embodiments, be set by the machine vision system 100 based on current conditions at the distribution network environment and/or historical data. The upper threshold may vary from zone to zone. For example, a zone proximate a dock door or pathway for item and/or asset transportation may have a relatively low upper threshold to prevent blocking the dock door or pathway, and a zone disposed away from the dock door and/or a pathway may have an upper threshold that is relatively higher. The upper threshold may be a quantity (e.g., 800 square feet), fraction (e.g., 8/10), percentage (e.g., 80%), and/or other metric indicative of the occupancy of the zone. If the occupancy of the zone has not exceeded the upper threshold, the process 400 returns to block 402. Thresholds may change based on the time of day, time of year, conditions at the distribution network environment, quantity of item(s) and/or asset(s) at the distribution network environment, and/or other factors. In some embodiments, the machine vision system 100 may determine if the occupancy has exceeded the upper threshold for a period of time (e.g., one minute, one hour, three hours, etc.)

If the occupancy of the zone has exceeded the upper threshold, the process 400 continues to block 408, wherein the machine vision system 100 generates a notification. The notification may include visual, audible, and/or haptic alerts to notify an operator of the excessive occupancy. In some embodiments, the machine vision system 100 may prompt, suggest, or cause the retrieval of one or more item(s) and/or asset(s) by way of an asset, such as an operator, AGV, forklift, tug, etc. For example, the machine vision system 100 may automatically summon an AGV to retrieve one or more item(s) and/or asset(s) that have exceeded the dwell time. The machine vision system 100 may communicate the identity and/or location of the item(s) and/or asset(s) to the asset. The asset can retrieve and relocate the one or more items and/or assets, which can include relocating the item(s) and/or asset(s) to a location specified by the machine vision system 100 (e.g., a zone that has a lower occupancy). The machine vision system 100 may determine a location based on conditions in the distribution network environment.

If the occupancy of the zone has fallen below the lower threshold, the process 400 continues to block 408, wherein the machine vision system 100 generates a notification. The notification may include visual, audible, and/or haptic alerts to notify an operator of the low occupancy. In some embodiments, the machine vision system 100 may prompt and/or suggest the delivery of one or more item(s) and/or asset(s) by way of an asset, such as an operator, AGV, forklift, tug, etc., to the zone with the low occupancy.

The machine vision system 100 may change processing procedures at the distribution network environment based on the occupancies of zones. The machine vision system 100 may redirect item(s) and/or asset(s) based on the occupancies of zones. For example, the machine vision system 100 may monitor occupancy levels across multiple zones, and based on the monitor, the machine vision system 100 may determine where to route items and/or assets, which can include routing item(s) and/or asset(s) to zones with lower occupancy levels. The machine vision system 100 may suggest or command that item(s) and/or asset(s) be redirected to another zone if the occupancy of the zone is too high. In some embodiments, the machine vision system 100 can identify a zone that is reaching or has reached a threshold occupancy level and can identify zones which are below the threshold levels. The machine vision system can alert an operator or can summon an asset to move an item from the zone which is at or above the threshold to a zone which has occupancy below its occupancy threshold. In some embodiments, the machine vision system can identify the zone below the occupancy threshold which is nearest the intended or correct location for the item in the zone above the threshold and move the item to the identified zone.

If the occupancy of a zone is reaching or has reached a threshold, the machine vision system 100 can slow or stop a piece of equipment, such as item processing equipment or sorting equipment in the zone to reduce the generation of new items in the zone or to reduce the buildup of items in the zone.

Figure 18:
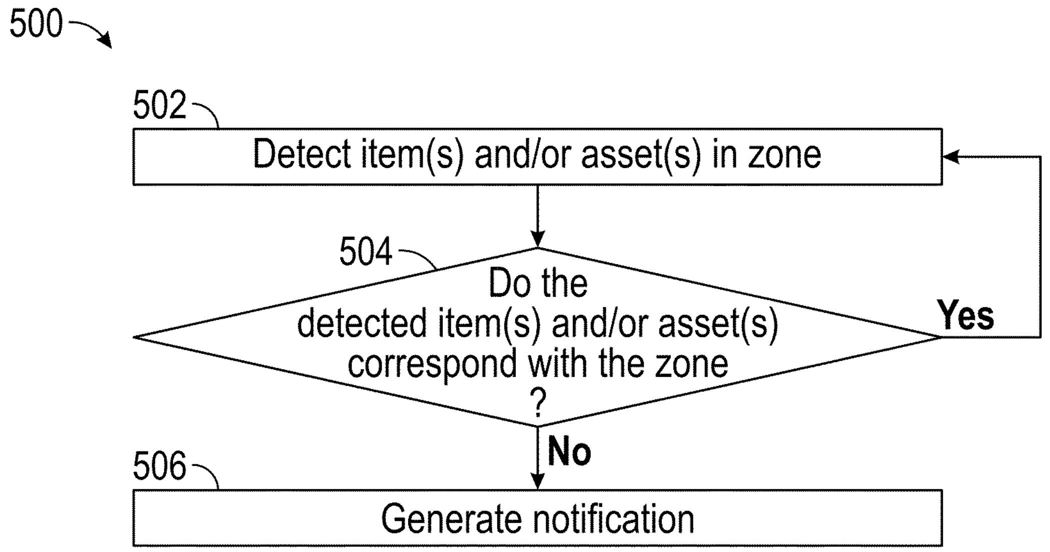
FIG. 18 illustrates an exemplary process of generating notifications based on whether an item and/or asset detected in a zone corresponds with the zone.

FIG. 18 is a flow diagram depicting an exemplary process 500 for generating notifications based on the item(s) and/or asset(s) detected in a zone. The flow diagram is provided for the purpose of facilitating description of aspects of some embodiments. The diagram does not attempt to illustrate all aspects of the disclosure and should not be considered limiting.

The process 500 begins at block 502, wherein the machine vision system 100 detects, which can include identifying, item(s) and/or asset(s) in the zone. The machine vision system 100 may include one or more sensors, such as a camera, that enable the machine vision system 100 to detect items and/or assets. Item(s) and/or asset(s) may include a computer readable code (e.g., placard disposed on the items and/or assets) that can be read by the machine vision system 100 by way of one or more sensors to identify the items and/or assets. Based on the computer readable code, the machine vision system 100 may determine the type of items and/or assets, route scheduled for the items and/or assets, destination of the items and/or assets, etc. In some embodiments, the machine vision system 100 may access a database and identify data associated with the item(s) and/or asset(s) based on the identity of the items and/or assets. In some embodiments, the machine vision system 100 may identify item(s) and/or asset(s) by the unique characteristics of the items and/or assets, which can include wear patterns, paint, size, shape, material, etc. For example, the machine vision system 100 may have a reference library of item(s) and/or asset(s) and their unique characteristics so that the machine vision system 100 may recognize item(s) and/or asset(s) with or without the assistance of a computer readable code to identify the items and/or assets. Based on the identity of the items and/or assets, the machine vision system 100 may determine route scheduled for the items and/or assets, destination of the items and/or assets, etc.

The process 500 continues to decision state 504, wherein the machine vision system 100 determines if the detected item(s) and/or asset(s) correspond with the zone. As detailed herein, the machine vision system 100 may determine the route scheduled for the items and/or assets, destination of the items and/or assets, etc. Accordingly, the machine vision system 100 may determine if the item(s) and/or asset(s) being located in the zone is consistent with the route scheduled for the items and/or assets. For example, a zone may correspond to a dock door that is dedicated to shipping to a first destination, but an identified item(s) and/or asset(s) in the zone may be intended for a different destination. Accordingly, the machine vision system 100 may determine that the identified item(s) and/or asset(s) do not correspond with the zone. If the identified item(s) and/or asset(s) do correspond to the zone, the process 500 may return to block 502.

If the identified item(s) and/or asset(s) do not correspond to the zone, the process 500 may proceed to block 506, wherein the machine vision system 100 may generate a notification. The notification may include visual, audible, and/or haptic alerts to notify an operator that the identified item(s) and/or asset(s) do not correspond with the zone. In some embodiments, the machine vision system 100 may prompt, suggest, or cause the retrieval of the identified item(s) and/or asset(s) by way of an automatically summoning asset, such as an operator, AGV, forklift, tug, etc. For example, the machine vision system 100 may summon an AGV to retrieve the identified item(s) and/or asset(s) that do not correspond to the zone. The machine vision system 100 may communicate the identity and/or location(s) of the item(s) and/or asset(s) to the asset. The asset can retrieve and relocate the identified items and/or assets, which can include relocating the item(s) and/or asset(s) to a location specified by the machine vision system 100 (e.g., to a zone that corresponds to the route and/or destination of the identified item(s) and/or asset(s)). In some embodiments, the machine vision system 100 may determine a location based on conditions in the distribution network environment.

In some embodiments, the machine vision system 100 may generate a notification if a specific item and/or asset is not found in a zone.

Figure 19:
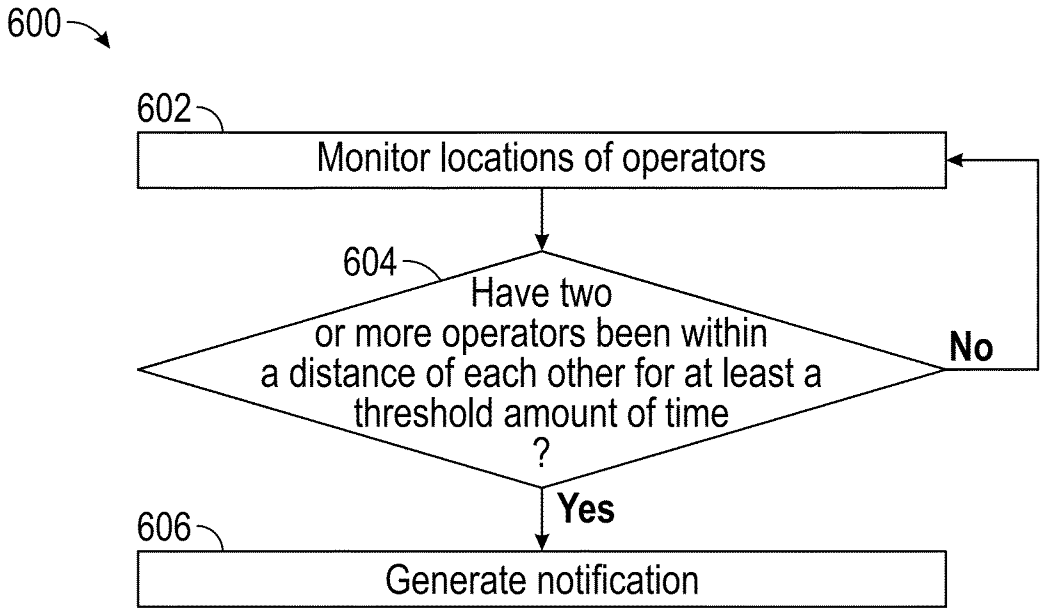
FIG. 19 illustrates an exemplary process of generating notifications based on two or more operators proximity for a duration of time.

FIG. 19 is a flow diagram depicting an exemplary process 600 for generating notifications based on the monitored locations of operators. The flow diagram is provided for the purpose of facilitating description of aspects of some embodiments. The diagram does not attempt to illustrate all aspects of the disclosure and should not be considered limiting.

The process 600 begins at block 602, wherein the machine vision system 100 monitors the location of operators in the distribution network environment. The machine vision system 100 may include one or more sensors, such as a camera, that enable the machine vision system 100 to identify operators and track their locations. In some embodiments, the machine vision system 100 may identify an operator based on the unique characteristics of the operator, which can include using facial recognition. In some embodiments, each operator may have a computer readable code disposed on the operator, and the machine vision system 100 may read the computer readable code to identify the operator.

The process 600 continues to decision state 604, wherein the machine vision system 100 may determine if two or more operators have been within a distance (e.g., six feet) of each other for at least a threshold amount of time (e.g., fifteen minutes). The distance and/or threshold amount of time may vary based on distribution network environment standards to avoid the spread of one or more communicable diseases. If the machine vision system 100 determines that two or more operators have not been within the distance of each other for at least the threshold amount of time, the process 600 may return to block 602.

If the machine vision system 100 determines that two or more operators have been within the distance of each other for at least the threshold amount of time, the process 600 continues to block 606, wherein the machine vision system 100 generates a notification. The notification may include visual, audible, and/or haptic alerts to notify one or more operators, including a manager of the operators, that the two or more operators have not complied with distribution network environment standards regarding proximity and duration of time.

In some embodiments, the machine vision system 100 may contact trace by determining a list of operators that have been within a distance of a sick operator for a threshold amount of time. The machine vision system 100 may notify one or more operators based on the contract tracing.

The machine vision system 100 may monitor a retail space of a distribution network environment. The machine vision system 100 may monitor the wait times in line. The machine vision system 100 may follow and log a customer journey in the retail space. The machine vision system 100 may determine how much time customers spend in different locations of the retail space. The machine vision system 100 may identify when a customer abandons a transaction (e.g., in line, after how much time of waiting in line, while reviewing products, while packaging a product, etc.). The machine vision system 100 may monitor customer counts over time. The machine vision system 100 may monitor compliance when social distancing is desired. The machine vision system 100 may recommend changes to a retail space to an operator based on observations of the retail space.

In some embodiments, the machine vision system 100 may request one or more operators assist in the retail space based on conditions in the retail space. For example, if the customer account in the retail space reaches a threshold, the machine vision system 100 may request one or more operators to assist in the retail space. The machine vision system 100 may request one or more operators if a threshold number of customers are waiting in line and/or if the estimated or actual wait time in line exceeds a threshold. The machine vision system 100 may request one or more operators based on projected activity in the retail space based on current and/or historical conditions.

In some embodiments, the machine vision system 100 may predict staffing requirements based on current and/or historical conditions (e.g., dwell times of items and/or assets, notification amounts, quantities of items and/or assets, occupancy levels of zones, etc.) in the distribution network environment, which may include the retail space. The machine vision system 100 may predict the type of staff needed based on conditions in the distribution network environment. For example, the machine vision system 100 may predict that a quantity of staff with fork lift certifications are needed based on conditions in the distribution network environment (e.g., the quantity of item containers requiring movement by way of a forklift).

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present disclosure. This disclosure is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this disclosure be limited to the specific embodiments disclosed herein, but that it cover all modifications and alternatives coming within the true scope and spirit of the disclosure as embodied in the attached claims.

While the above detailed description has shown, described, and pointed out novel features of the improvements as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A machine vision system for a distribution facility, the system comprising:

one or more sensors configured to capture a field of view of a zone in the distribution facility; and a control system comprising a controller, a processor, and a memory system comprising instructions, wherein the processor is connected to the memory system and executes the instructions that cause the control system to:

receive sensor input of the captured field of view;

interpret the sensor input to identify one or more items and assets in the zone; and monitor an occupancy of the identified one or more items and assets in the zone;

determine if the occupancy has exceeded a threshold; and in response to determining that the occupancy of the zone has exceeded the threshold, automatically moving an automated guided vehicle to retrieve the identified one or more items from the zone.

2. The system of claim 1, wherein the instructions, when executed by the processor, cause the control system to:

monitor a dwell time of the one or more items in the zone;

determine if the dwell time has exceeded a threshold dwell time; and in response to determining that the dwell time has exceeded the threshold dwell time, generate a notification that the dwell time has exceeded the threshold dwell time.

3. The system of claim 2, wherein the instructions, when executed by the processor, cause the control system to:

in response to determining that the dwell time has exceeded the threshold dwell time, summon an automated guided vehicle to retrieve the one or more items.

4. The system of claim 3, wherein the instructions, when executed by the processor, cause the control system to:

command the automated guided vehicle to transport the one or more items to another location in the distribution facility.

5. The system of claim 1, wherein the instructions, when executed by the processor, cause the control system to:

determine if the occupancy of the zone has exceeded the threshold for a threshold amount of time; and in response to determining that the occupancy of the zone has exceeded the threshold for the threshold amount of time, automatically moving an automated guided vehicle to retrieve the identified one or more items from the zone.

6. The system of claim 1, wherein the instructions, when executed by the processor, cause the control system to command the automated guided vehicle to transport the one or more items from the zone to another zone having an occupancy to receive the one or more items.

7. The system of claim 1, wherein the instructions, when executed by the processor, cause the control system to identify a destination zone for the one or more items, the destination zone having an occupancy determined by the control system, less than the threshold to receive the one or more items.

8. The system of claim 1, wherein the control system identifies the one or more items in the zone by reading a computer readable code on the one or more items.

9. The system of claim 8, wherein the control system identifies the one or more items in the zone by recognizing unique characteristics of the one or more items.

10. The system of claim 9, wherein the unique characteristics comprise wear patterns on the one or more items.

11. The system of claim 8, wherein the instructions, when executed by the processor, cause the control system to:

determine a route for the identified one or more items;

determine if the one or more items being in the zone is consistent with the route;

and in response to determining that the one or more items being in the zone is not consistent with the route, indicate generate a notification that the one or more items being in the zone is not consistent with the route.

12. The system of claim 1, wherein the instructions, when executed by the processor, cause the control system to command the automated guided vehicle to transport the one or more items from the zone to another location having an occupancy less than the threshold, determined by the control system, to receive the one or more items.

13. The system of claim 1, wherein the instructions, when executed by the processor, cause the control system to determine a fill level of the one or more items.

* * * * *